United States Patent
Sopori et al.

(10) Patent No.: US 10,684,128 B2
(45) Date of Patent: Jun. 16, 2020

(54) BATCH AND CONTINUOUS METHODS FOR EVALUATING THE PHYSICAL AND THERMAL PROPERTIES OF FILMS

(71) Applicants: Alliance for Sustainable Energy, LLC, Golden, CO (US); UT-Battelle, LLC, Oak Ridge, TN (US)

(72) Inventors: Bhushan Lal Sopori, Idledale, CO (US); Michael Joseph Ulsh, Broomfield, CO (US); Przemyslaw Rupnowski, Golden, CO (US); Guido Bender, Arvada, CO (US); Michael Mihaylov Penev, Golden, CO (US); Jianlin Li, Knoxville, TN (US); David L. Wood, III, Knoxville, TN (US); Claus Daniel, Knoxville, TN (US)

(73) Assignees: Alliance for Sustainable Energy, LLC, Golden, CO (US); UT-Battelle, LLC, Oak Ridge, TN (US)

( * ) Notice: Subject to any disclaimer, the term of this patent is extended or adjusted under 35 U.S.C. 154(b) by 277 days.

(21) Appl. No.: 15/554,551

(22) PCT Filed: Mar. 8, 2016

(86) PCT No.: PCT/IB2016/051314
§ 371 (c)(1),
(2) Date: Aug. 30, 2017

(87) PCT Pub. No.: WO2016/142864
PCT Pub. Date: Sep. 15, 2016

(65) Prior Publication Data
US 2018/0066940 A1    Mar. 8, 2018

Related U.S. Application Data

(60) Provisional application No. 62/130,346, filed on Mar. 9, 2015.

(51) Int. Cl.
*G01B 21/08* (2006.01)
*G01N 9/00* (2006.01)
(Continued)

(52) U.S. Cl.
CPC .............. *G01B 21/085* (2013.01); *G01N 9/00* (2013.01); *G01N 15/088* (2013.01);
(Continued)

(58) Field of Classification Search
CPC ...... G01B 21/085; G01B 21/00; G01B 21/02; G01B 7/00; G01B 7/06; G01B 15/02;
(Continued)

(56) References Cited

U.S. PATENT DOCUMENTS 2,971,073 A    2/1961    Eisler
3,350,077 A    11/1967   Mendelsohn
(Continued)

FOREIGN PATENT DOCUMENTS

DE    102013221592 A1    5/2015
JP    2005038694 A       2/2005
(Continued)

OTHER PUBLICATIONS

Eshelby, J. D., "The determination of the elastic field of an ellipsoidal inclusion, and related problems," Proceedings of the Royal Society of London, Series A, Mathematical and Physical Sciences, vol. 241, No. 1226, Aug. 20, 1957, pp. 376-396.
(Continued)

*Primary Examiner* — Manuel L Barbee
(74) *Attorney, Agent, or Firm* — Michael A. McIntyre

(57) ABSTRACT

Thermal methods and systems are described for the batch and/or continuous monitoring of films and/or membranes and/or electrodes produced in large-scale manufacturing lines. Some of the methods described include providing an energy input into a film, measuring a thermal response of the
(Continued)

film, and correlating these to one or more physical properties and/or characteristics of the film.

21 Claims, 27 Drawing Sheets

(51) Int. Cl.
*G01N 15/08* (2006.01)
*G01N 25/18* (2006.01)
*G01N 25/00* (2006.01)

(52) U.S. Cl.
CPC .......... *G01N 25/005* (2013.01); *G01N 25/18* (2013.01); *G01N 2015/086* (2013.01)

(58) Field of Classification Search
CPC ........ G01N 9/00; G01N 15/088; G01N 25/18; G01N 2015/086; G01N 23/00; G01N 25/00
See application file for complete search history.

(56) References Cited

U.S. PATENT DOCUMENTS

| | | | |
|---|---|---|---|
| 4,431,315 A | | 2/1984 | Utton et al. |
| 4,513,384 A | | 4/1985 | Rosencwaig |
| 5,089,700 A | | 2/1992 | Sapia et al. |
| 5,406,367 A | | 4/1995 | Sopori |
| 5,577,157 A | | 11/1996 | Sopori |
| 5,659,867 A | * | 8/1997 | Young ................ G03G 15/2053 219/216 |
| 5,688,049 A | | 11/1997 | Govorkov |
| 5,763,765 A | | 6/1998 | Lamont et al. |
| 5,838,016 A | * | 11/1998 | Johnson ................ G01J 3/108 250/504 R |
| 6,217,695 B1 | * | 4/2001 | Goldberg ................ B05D 3/06 156/244.17 |
| 6,275,295 B1 | | 8/2001 | Sopori |
| 6,512,815 B2 | * | 1/2003 | Opsal .................... G01N 23/20 356/432 |
| 6,643,393 B1 | | 11/2003 | Van et al. |
| 6,816,251 B2 | | 11/2004 | Swan et al. |
| 7,179,553 B2 | | 2/2007 | Murphy et al. |
| 7,324,192 B2 | | 1/2008 | Boehmisch et al. |
| 7,551,285 B2 | | 6/2009 | McFarland et al. |
| 7,687,176 B2 | | 3/2010 | Roscoe et al. |
| 8,003,170 B2 | | 8/2011 | Freeman et al. |
| 8,006,566 B2 | | 8/2011 | Sopori et al. |
| 8,128,278 B2 | | 3/2012 | Gotkis et al. |
| 8,462,990 B2 | | 6/2013 | Akashi et al. |
| 9,234,843 B2 | | 1/2016 | Sopori et al. |
| 2004/0253495 A1 | | 12/2004 | LaVen |
| 2005/0067772 A1 | | 3/2005 | Lockhart et al. |
| 2005/0150276 A1 | | 7/2005 | Schultz |
| 2006/0029121 A1 | | 2/2006 | Boehmisch et al. |
| 2006/0203876 A1 | * | 9/2006 | Gostein .............. G01B 11/0666 374/45 |
| 2011/0162391 A1 | * | 7/2011 | Ball-DiFazio .......... F04B 37/08 62/55.5 |
| 2013/0226330 A1 | | 8/2013 | Sopori et al. |
| 2013/0269436 A1 | | 10/2013 | Couse et al. |

FOREIGN PATENT DOCUMENTS

| | | |
|---|---|---|
| WO | WO 2001/069191 A1 | 9/2001 |
| WO | WO 2013/063278 A1 | 5/2013 |

OTHER PUBLICATIONS

Henderson, J. et al., "A Model for the Thermal Response of Polymer Composite Materials with Experimental Verification," Journal of Composite Materials, vol. 19, Nov. 1985, pp. 579-595.
Just, J. et al., "A method to quantify coating thickness and porosity of electrodes for lithium-ion-batteries," Elsevier Measurement, vol. 89, 2016, pp. 312-315.
Kehrwald, D. et al., "Local Tortuosity Inhomogeneities in a Lithium Battery Composite Electrode," Journal of the Electrochemical Society, vol. 158, No. 12, 2011, pp. A1939-A1399.
Li, J. et al., "Materials processing for lithium-ion batteries," Journal of Power Sources, vol. 196, 2011, pp. 2452-2460.
Li, J. et al., "Evaluation Residual Moisture in Lithium-Ion Battery Electrodes and Its Effect on Electrode Performance," MRS Advances, vol. 1, No. 15, pp. 1029-1035.
Matsuchita Electric Inc. Co. Ltd., English translation of JP 2005038694 A, accessed on Espacenet, Aug. 7, 2017, 35 pages.
Sharp, N. et al., "Lithium-ion battery electrode inspection using pulse thermography," Elsevier, NDT&E International, vol. 64, 2014, pp. 41-51.
Sheng, Y. et al., "Effect of calendering on electrode wettability in lithium-ion batteries," Frontiers in Energy Research, vol. 2, Article 56, Dec. 2014, pp. 1-8.
Srinivasan, V. et al., "Analysis of Electrochemical and Thermal Behavior of Li-Ion Cells," Journal of the Electrochemical Society, vol. 150, No. 1, 2003, pp. A98-A1-06.
Stransky, J. et al., "Mori-Tanaka Based Estimates of Effective Thermal Conductivity of Various Engineering Materials," Micromachines, vol. 2, 2011, pp. 129-149.
Search Report from corresponding PCT patent application No. PCT/IB16/51314, dated Jul. 29, 2016, two pages.
Written Opinion from corresponding PCT patent application No. PCT/IB16/51314, dated Jul. 29, 2016, nine pages.

* cited by examiner

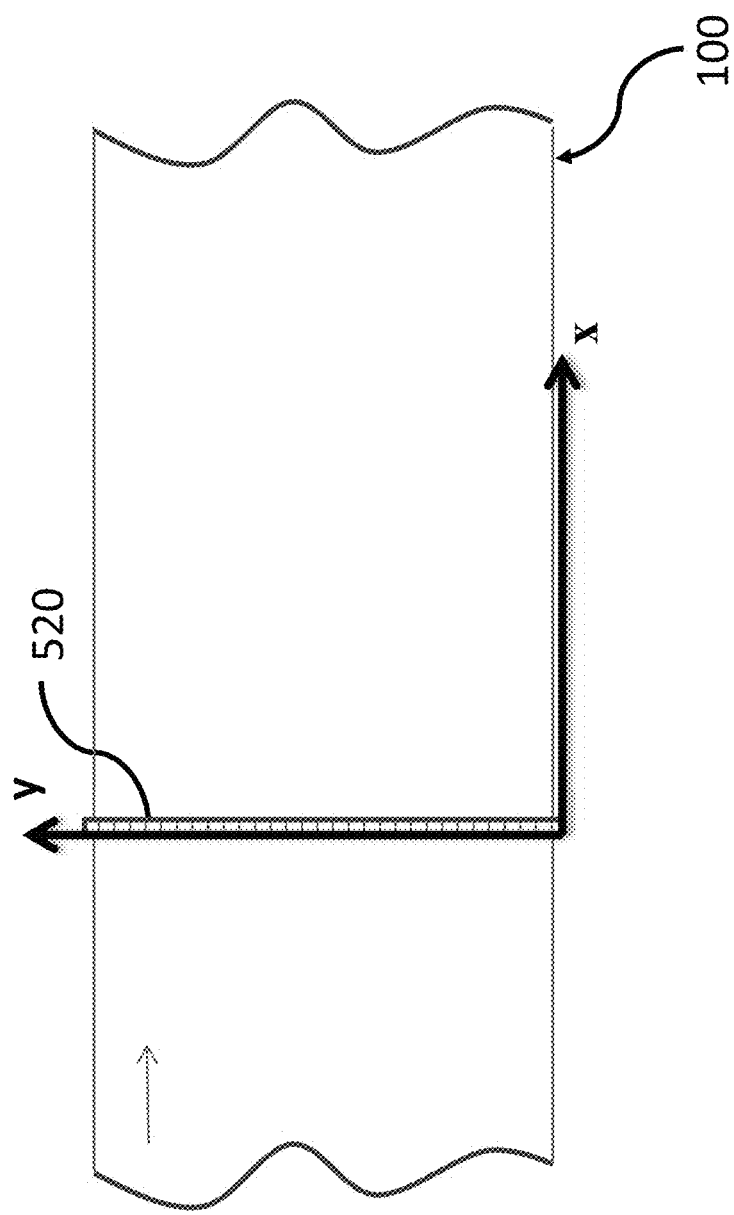

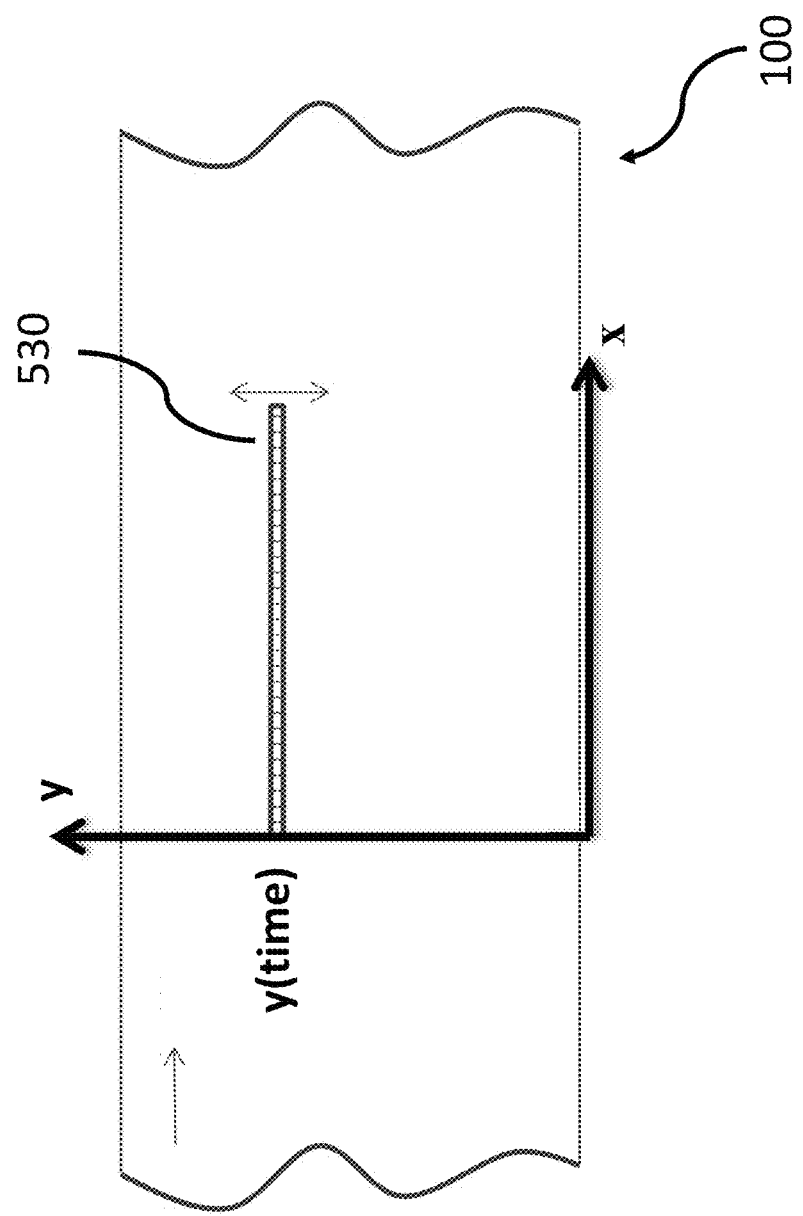

BATCH AND CONTINUOUS METHODS FOR EVALUATING THE PHYSICAL AND THERMAL PROPERTIES OF FILMS

CROSS-REFERENCE TO RELATED APPLICATIONS

This application claims priority to PCT/IB2016/051314 filed Mar. 8, 2016, having the same title, and the same inventors, which claims the benefit of U.S. Provisional Application No. 62/130,346 filed Mar. 9, 2015, the contents of which are incorporated herein by reference in their entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory. This invention was made with government support under Contract No. DE-AC05-00OR22725 awarded by the U.S. Department of Energy. The government has certain rights in the invention.

BACKGROUND

Various forms of membranes and thin films find numerous industrial and commercial uses. For example, these materials are frequently used in separation processes, including water treatment, reverse osmosis, pervaporation, dialysis, solvent extraction, and gas permeation methods. In addition, films are used in many commercial devices, such as photovoltaics, electronics, electrodes, and batteries to provide beneficial physical properties and/or electrical properties.

However, the performance, life, and ultimately the cost of films depend heavily on how they are manufactured. For example, to be economically viable, manufacturing processes often need to be large-scale and operated continuously in order to take advantage of economies of scale. In addition, industrial manufacturing processes must be able to reliably and consistently meet minimum quality standards to maximize the manufacturing plant's production rates, to minimize recycle and waste, and to insure the quality and performance of the final manufactured items.

The quality and performance of films depend heavily on the quality and characteristics of materials that are used to construct them. For example, often interrelated physical properties such as density, porosity, thermal conductivity, electrical conductivity, heat capacity, and multi-phase homogeneity or heterogeneity, may all significantly impact how films perform in their final intended applications. In addition, physical defects within the films and/or at their surfaces, for example scuffs, scores, slits, bubbles, pinholes, bubbles, agglomerates, occlusions and/or other bulk and/or surface inhomogeneities may be especially detrimental to film performance. Once the occurrence of such defects reach a certain critical threshold, the manufacturing process may become inefficient and costly. To avoid potential shutdowns, to minimize production costs, and to maximize product quality, on-line methods have been developed to detect, identify, and/or quantify film quality issues. However, many of the methods developed to date remain unreliable, difficult to use in a manufacturing environment, costly, and/or are unable to detect the size, shape, and/or density of film defects.

For these reasons, it is apparent that there exists a need for fast, reliable, non-destructive, and cost-effective, online evaluation of thin films, membranes and electrodes, especially for large-scale, continuous manufacturing environments. Development of such methods may in turn enable new emerging technologies that utilize films and membranes and electrodes to better compete with incumbent technologies, from both performance and economic perspectives.

SUMMARY

An aspect of the present invention is a method that includes transferring heat to a first portion of a film, where the transferring causes a thermal response in at least the first portion of the film, measuring at least a part of the thermal response, generating at least one thermal response metric that represents the at least the part of the thermal response, and determining a physical property of the film by inputting the at least one thermal response metric into a predictive model. In some embodiments of the present disclosure, the transferring may include exposing the first portion of the film to electromagnetic radiation having a plurality of first wavelengths between about 1 µm and about 1 mm. In some embodiments of the present disclosure, each of the plurality of first wavelengths may be between about 700 nm and about 1 mm.

In some embodiments of the present disclosure, the transferring may be performed by at least one of a light-emitting diode, an infrared heater, an infrared lamp, a resistive heating element, and/or a heated roller. In some embodiments of the present disclosure, the transferring to the first portion of the film may be at a heating rate between about 1 watt per centimeter and about 1000 watts per centimeter, where the heating rate may be defined as watts per unit length of the film and/or watts per unit width of the film. In some embodiments of the present disclosure, the heating rate may be supplied continuously. In some embodiments of the present disclosure, the heating rate may be supplied for a period of time between about 1 second and about 15 minutes. The heating rate may be supplied for a period of time between about 1 second and about 3 minutes.

In some embodiments of the present disclosure, the thermal response may include electromagnetic radiation emitted from at least the first portion of the film, where the emitted electromagnetic radiation may include at least one second wavelength that is greater than or equal to at least one of the plurality of first wavelengths, and the measuring may include detecting an intensity of the at least one second wavelength. In some embodiments of the present disclosure, the at least one thermal response metric may correspond to at least one change in a surface temperature of at least the first portion of the film. In some embodiments of the present disclosure, the at least one change in surface temperature may be relative to a reference temperature that is between about 0° C. and about 100° C. The at least one change in surface temperature may be between about 0.01° C. and about 100° C. The measuring may be performed by a detector that includes at least one of an infrared camera and/or a microbolometer.

In some embodiments of the present disclosure, the predictive model may include a calibration curve that correlates the at least one thermal response metric with at least one of a film density, a film porosity, and/or a film thickness. In some embodiments of the present disclosure, the predictive model may include a microscale model that estimates an effective heat conductivity as a first function of at least the actual heat conductivities of at least two components of the film, where the microscale model estimates an effective heat capacity of the film as a second function of the actual heat capacities of the at least two components of the film, and a macroscale model that estimates at least one of a film density, a film porosity, and/or a film thickness as a function of at least the effective heat conductivity, the effective heat capacity, and the at least one thermal response metric. The at least two components may include at least two of voids, solid particles, and/or binder.

In some embodiments of the present disclosure, the method may also include, prior to the transferring, radiating a second portion of the film, where the radiating results in a radiation response, detecting at least a part of the radiation response, and determining, using at least the at least the part of the radiation response, a thickness of the film. In some embodiments of the present disclosure, the radiating may be performed using at least one laser. In some embodiments of the present disclosure, the radiating may be performed using at least one x-ray source. The radiating may provide electromagnetic radiation having a wavelength between about 0.01 nm and about 10 nm. The radiation response may include at least one of transmitted electromagnetic radiation, emitted electromagnetic radiation, and/or reflected electromagnetic radiation. In some embodiments of the present disclosure, the thickness may be an input to the predictive model.

An aspect of the present invention, is a system that includes a heat source configured to transfer heat to at least a portion of a film, a first detector, and a predictive model, where the detector is configured to detect at least one thermal response in at least the first portion of the film caused by the heat source, and the predictive model receives the at least one thermal response to predict at least one of a density, a porosity, and/or a thickness of the film. In some embodiments of the present disclosure, the heat source may include at least one radiation source. In some embodiments of the present disclosure, the radiation source may include at least one of a light-emitting diode, an infrared heater, an infrared lamp, and/or a resistive heating element. The radiation source may radiate electromagnetic radiation having a plurality of wavelengths between about 1 µm and about 1 mm.

In some embodiments of the present disclosure, the radiation source may include at least one resistive heating element and a reflector. The at least one resistive heating element may include at least one of a rod, a cylinder, and/or a filament. The at least one resistive heating element may have a first emissivity between greater than zero and about 0.80. The at least one resistive heating element may include an inner core of steel and an outer layer of aluminum foil. The outer layer of aluminum foil may be black anodized aluminum foil. In some embodiments of the present disclosure, the resistive heating element may include a modified section, where the modified section may be modified by at least one of polishing, painting, and/or coating the modified section, and the modified portion has a second emissivity that is less than the first emissivity. The reflector may have a shape substantially in the form of a part of an elliptical cylinder.

In some embodiments of the present disclosure, the heat source may include at least one heating element, and the at least one heating element may contact the film such that the heat transferred to the film is at least partially by conductive heat transfer. The at least one heating element may be a heated roller. In some embodiments of the present disclosure, the system may include at least one stabilizing roller.

In some embodiments of the present disclosure, the predictive model may include a calibration curve. In some embodiments of the present disclosure, the predictive model may include a microscale model that estimates an effective heat conductivity as a first function of at least the actual heat conductivities of at least two components of the film, the microscale model estimates an effective heat capacity of the film as a second function of the actual heat capacities of the at least two components of the film, and a macroscale model that estimates at least one of a film density, a film porosity, and/or a film thickness as a function of at least the effective heat conductivity, the effective heat capacity, and the at least one thermal response metric. The at least two components may include at least two of voids, solid particles, and/or binder. The first detector may include at least one of an infrared camera and/or a microbolometer.

In some embodiments of the present disclosure, the system may also include at least one laser that transfers laser light to the film, and a second detector, where the second detector is configured to capture at least one of reflected laser light, the reflected laser light is used to calculate a thickness of the film, and the thickness is an input to the predictive model and used to predict the at least one of the density and/or the porosity of the film. In some embodiments of the present disclosure, the system may also include at least one x-ray source, and a second detector, where the second detector is configured to capture at least one of emitted x-rays, the emitted x-rays are used to calculate a thickness of the film, and the thickness is an input to the predictive model and used to predict the at least one of the density and/or the porosity of the film.

An aspect of the present invention is a method that includes radiating a first portion of a film, wherein the radiating results in a radiation response, detecting at least a part of the radiation response, determining, using at least the at least the part of the radiation response, a thickness of the film, transferring heat to a second portion of the film, where the transferring causes a thermal response in at least the second portion of the film, measuring at least a part of the thermal response, generating at least one thermal response metric that represents the at least the part of the thermal response, and determining a physical property of the film by inputting the at least one thermal response metric and the thickness of the film into a predictive model. The transferring is performed by at least one of a light-emitting diode, an infrared heater, an infrared lamp, a resistive heating element, and/or a heated roller. The transferring to the first portion of the film is at a heating rate between about 1 watt per centimeter and about 1000 watts per centimeter, and the heating rate is defined as watts per unit length of the film or watts per unit width of the film. The predictive model includes a microscale model that estimates an effective heat conductivity as a first function of at least the actual heat conductivities of at least two components of the film, the microscale model estimates an effective heat capacity of the film as a second function of the actual heat capacities of the at least two components of the film, and a macroscale model that estimates at least one of a film density and/or a film porosity as a function of at least the effective heat conductivity, the effective heat capacity, the thickness, and the at least one thermal response metric. The radiating is performed using at least one of a laser and/or an x-ray source.

An aspect of the present invention is a system that includes at least one laser configured to radiate laser light onto a film, a first detector configured to receive reflected laser light from the film, a heat source configured to transfer heat to at least a portion of a film, a second detector, and a predictive model, the second detector is configured to detect at least one thermal response in at least the portion of the film caused by the heat source, the first detector uses the reflected laser light to calculate a thickness of the film, and the predictive model receives the at least one thermal response and the thickness to predict at least one of a density and/or a porosity of the film. The heat source includes at least one radiation source that includes a resistive heating element and a reflector. The resistive heating element includes a rod and has a first emissivity between greater than zero and about 0.80. The at least one resistive heating element includes an inner core of steel and an outer layer of black anodized aluminum foil.

DRAWINGS

Some embodiments are illustrated in referenced figures of the drawings. It is intended that the embodiments and figures disclosed herein are to be considered illustrative rather than limiting.

FIG. 1 illustrates a method where energy is transferred to a film, membrane, or electrode, resulting in a thermal response within the film, membrane, or electrode, according to embodiments of the present disclosure.

FIGS. 2a, 2b, and 2c illustrate a resistive heating element and reflector for a radiation source, according to embodiments of the present disclosure.

FIGS. 5a-5d illustrate methods for configuring thermal response detectors for monitoring different portions of a film for estimating the film's physical properties, according to embodiments of the present disclosure.

Figure 10:
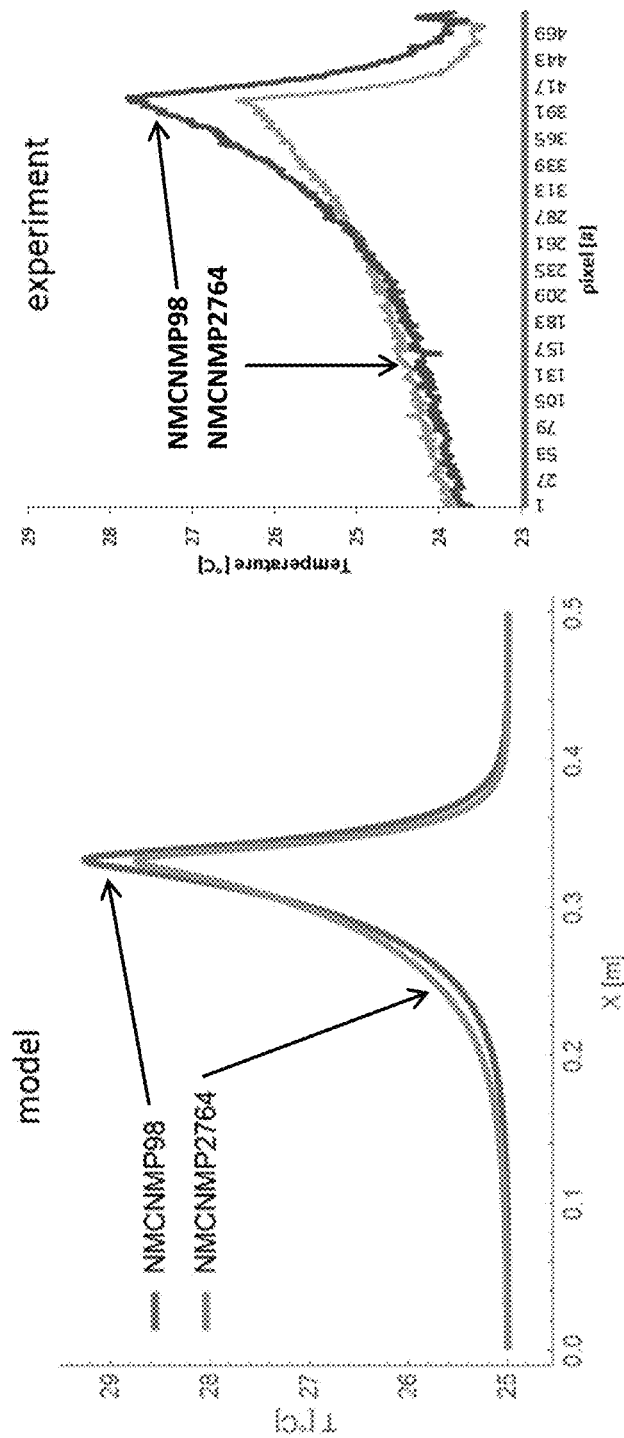

FIG. 10 compares predictive model results to experimental results of the thermal responses of battery cathodes as a result of an energy input into those continuous films (moving at 0.5 ft/min), according to embodiments of the present disclosure.

Figure 11:
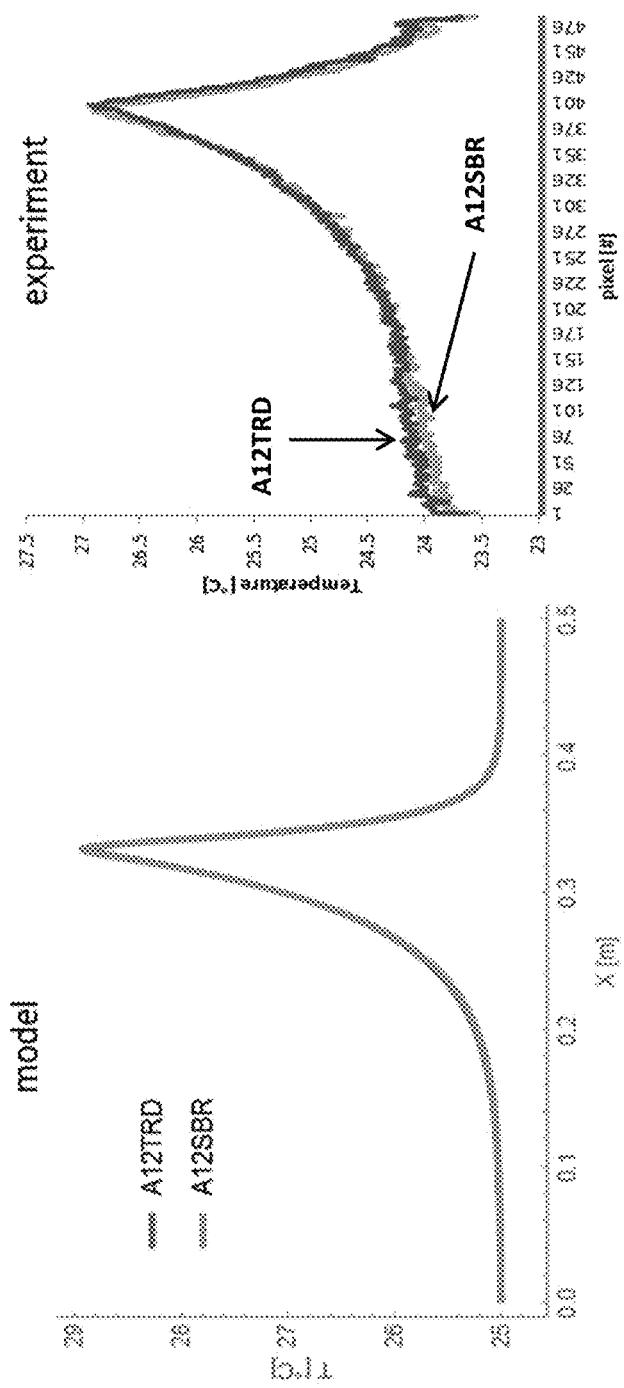

FIG. 11 compares predictive model results to experimental results of the thermal responses of battery anodes as a result of an energy input into those continuous films (moving at 0.5 ft/min), according to embodiments of the present disclosure.

Figure 12:
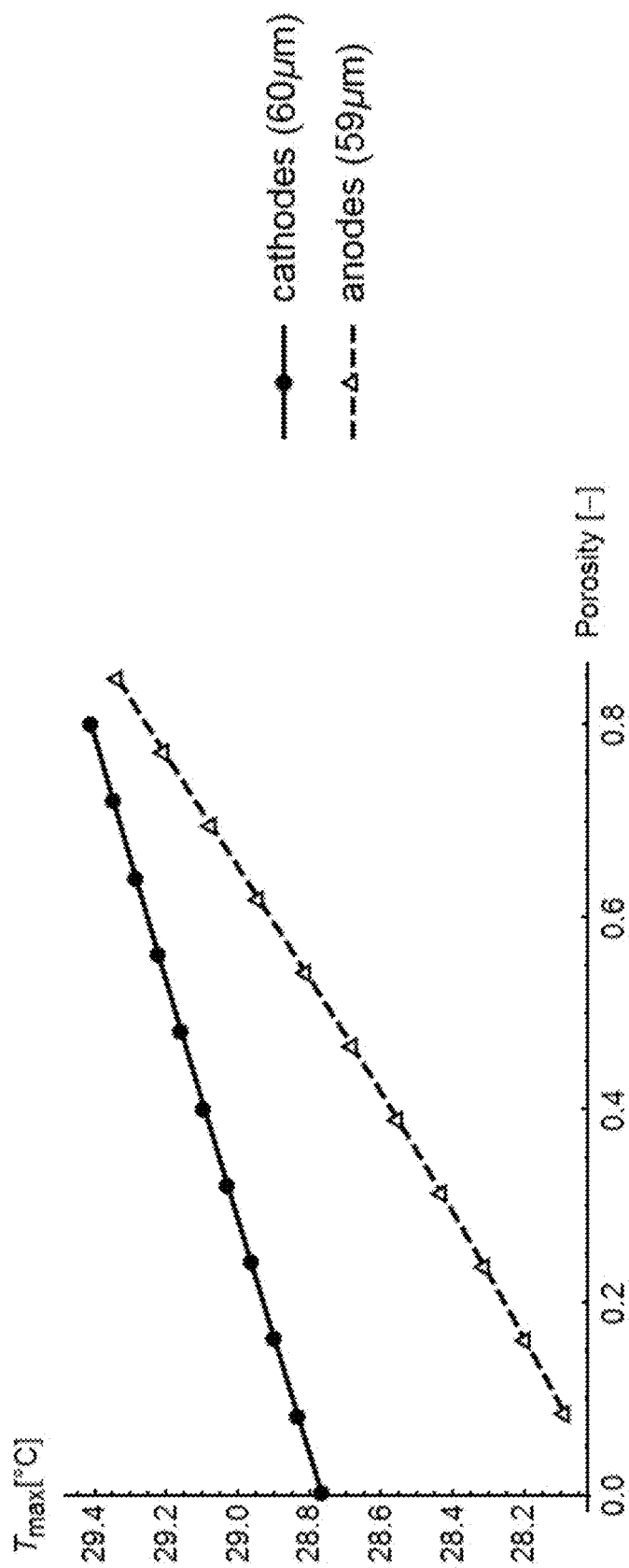
Figure 13:
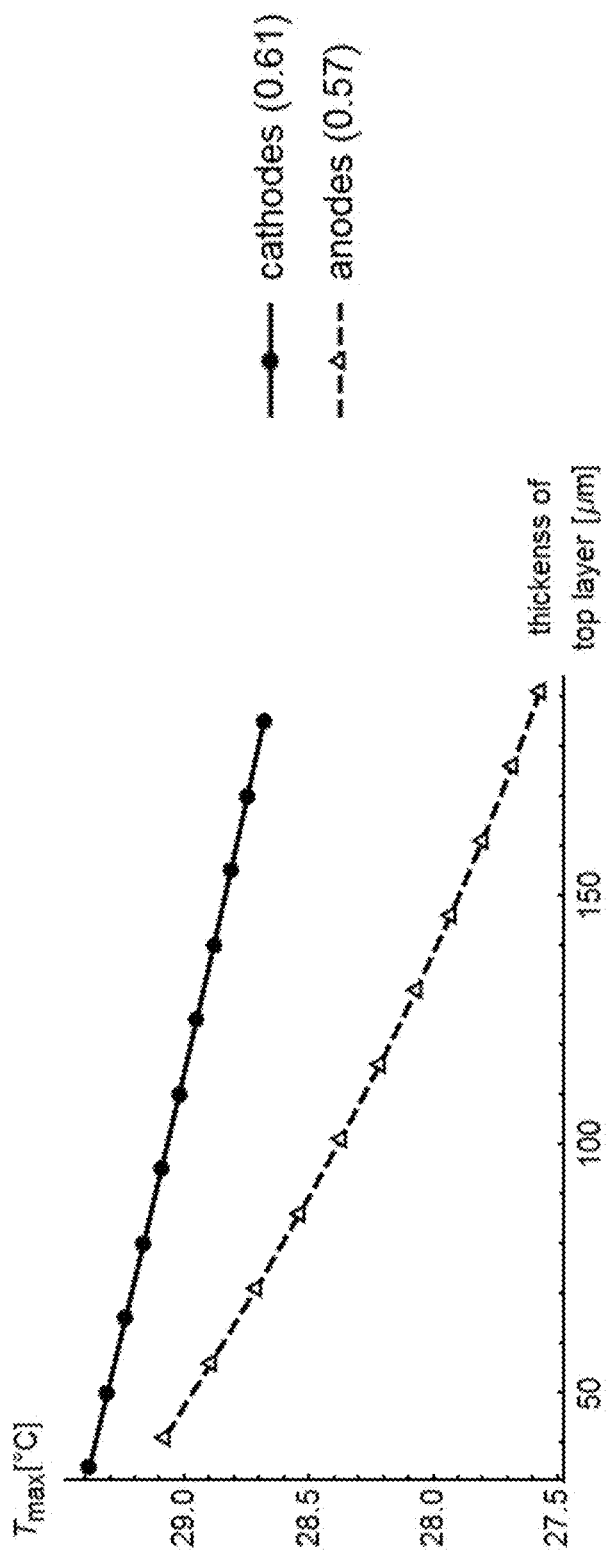

FIGS. 12 and 13 illustrate model predictive results for temperature responses of cathodes and anodes (e.g. films) as a result of energy inputs into the films as functions of thickness and porosity, according to embodiments of the present disclosure.

Figure 14:
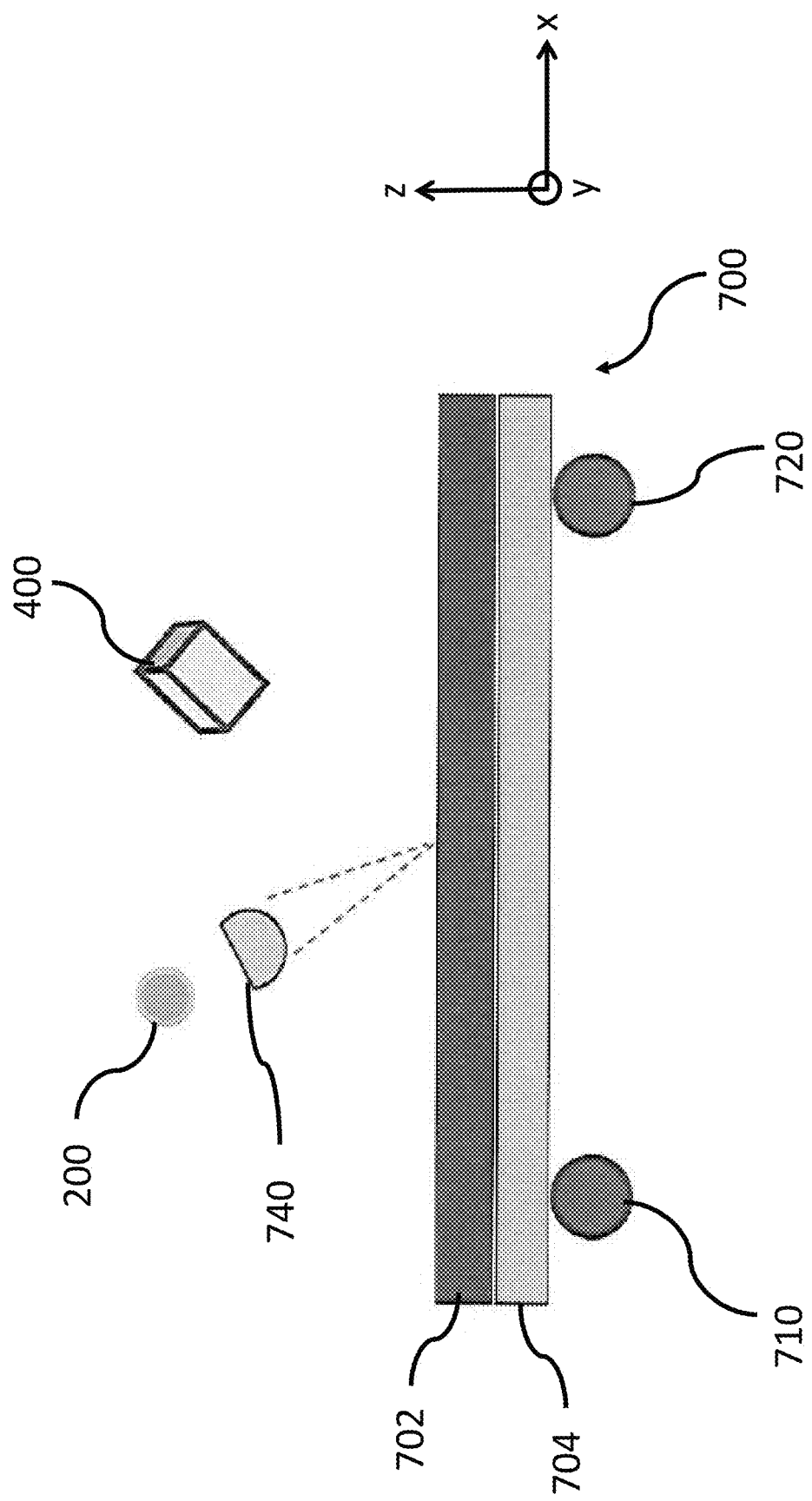

FIG. 14 illustrates a static or dynamic process for applying radiant energy to a film for evaluating a characteristic of the film, according to embodiments of the present disclosure.

Figure 15:
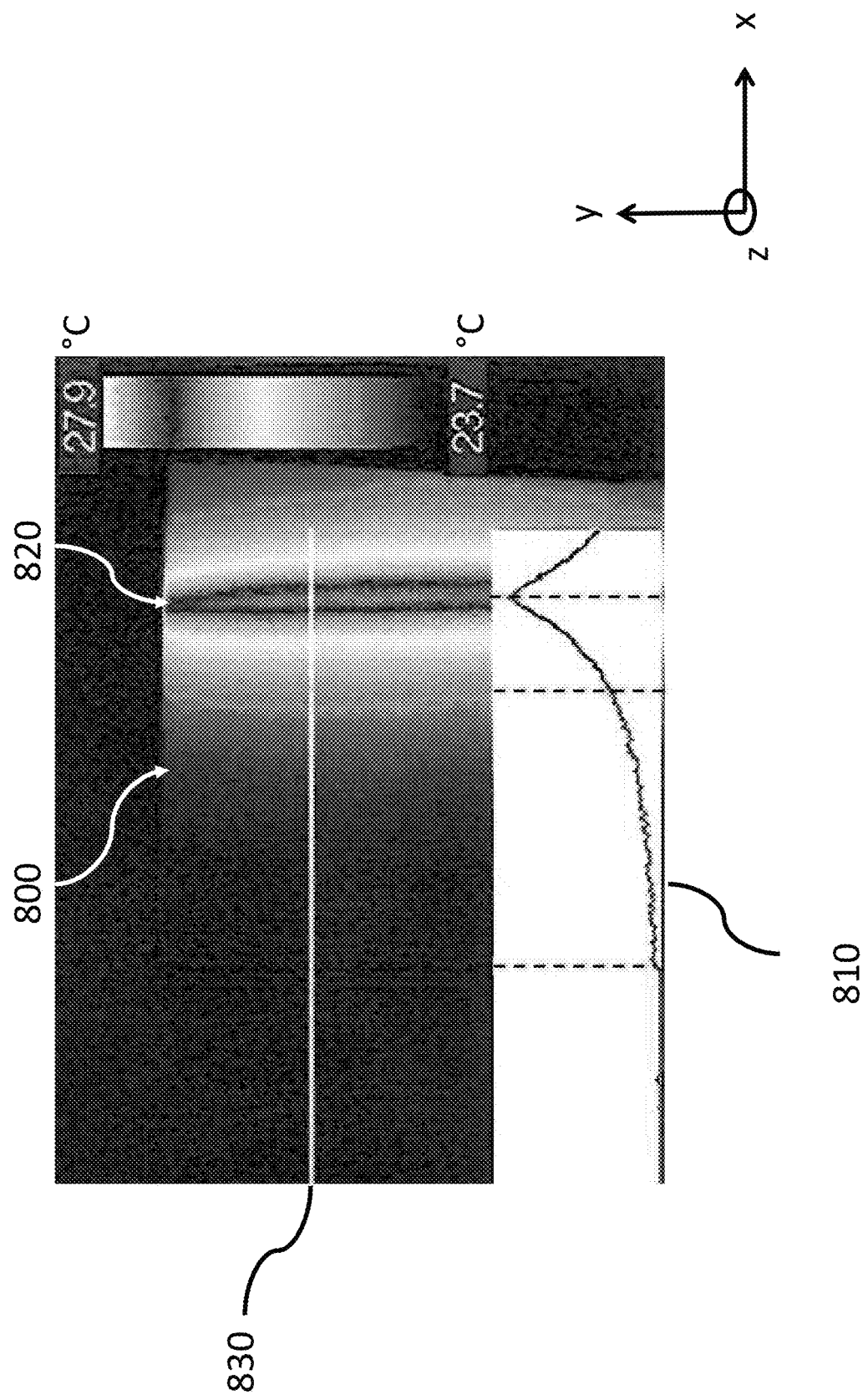

FIG. 15 illustrates a temperature map (thermal response) of a film evaluated using a static method like the method shown in FIG. 5, according to embodiments of the present disclosure.

Figure 16:
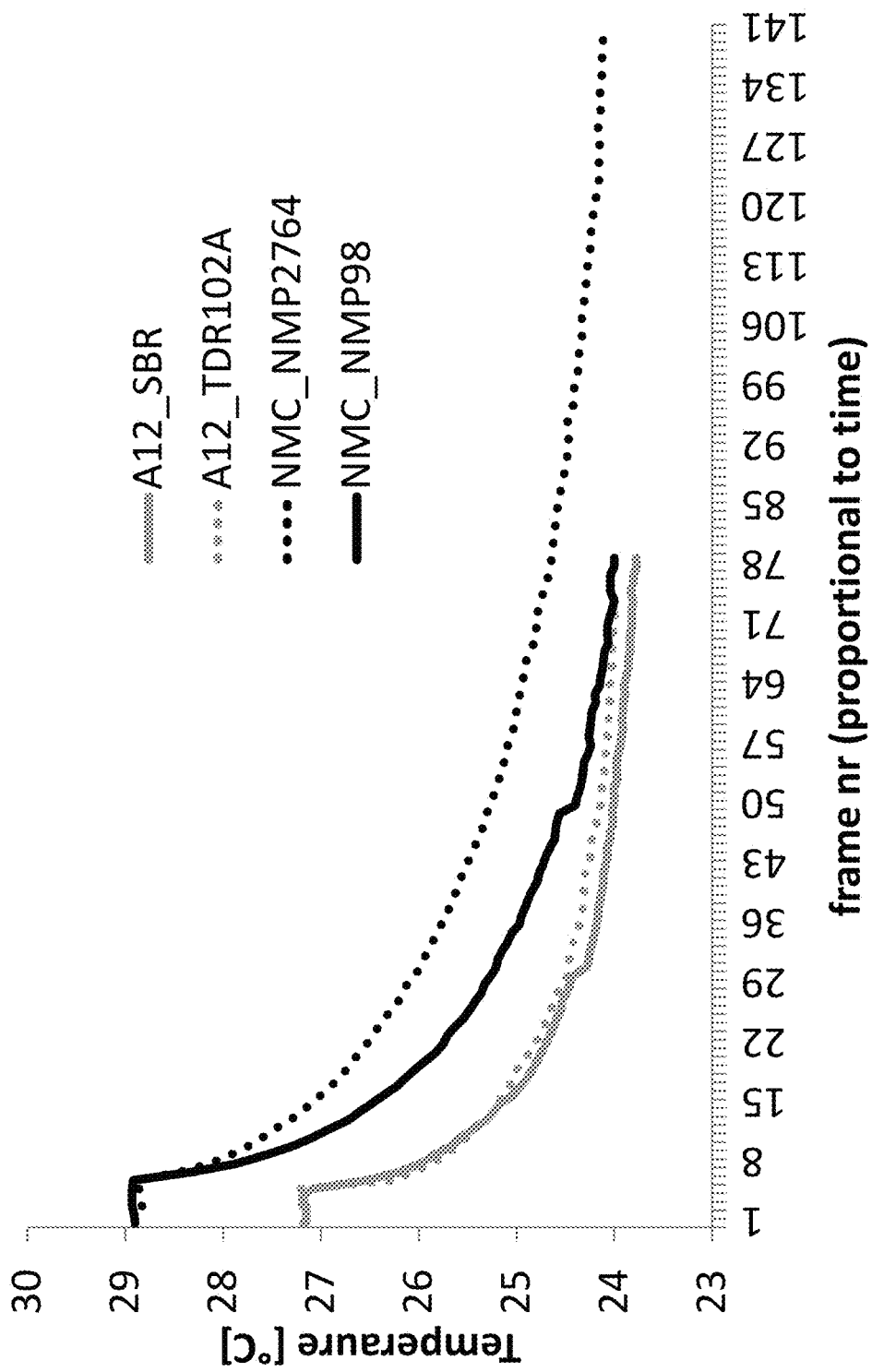

FIG. 16 illustrates examples of measured temperature decay curves (thermal response) obtained from battery electrodes, after heating them with radiant energy, using a static method, according to embodiments of the present disclosure.

Figure 17:
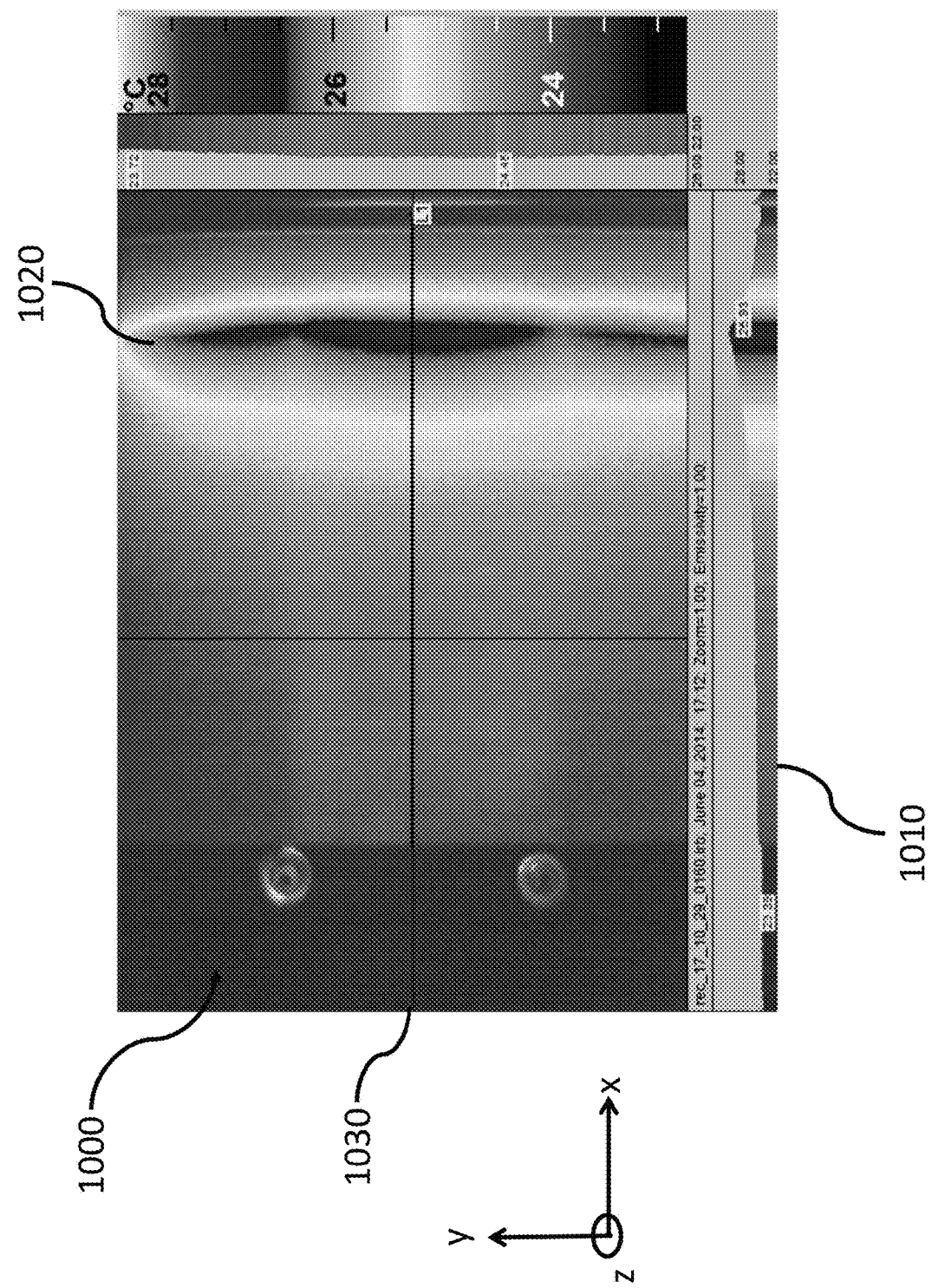

FIG. 17 illustrates a temperature map of a film evaluated using a dynamic method, where the film being evaluated was moved at a constant rate relative to a static light source and detector, according to embodiments of the present disclosure.

Figure 18:
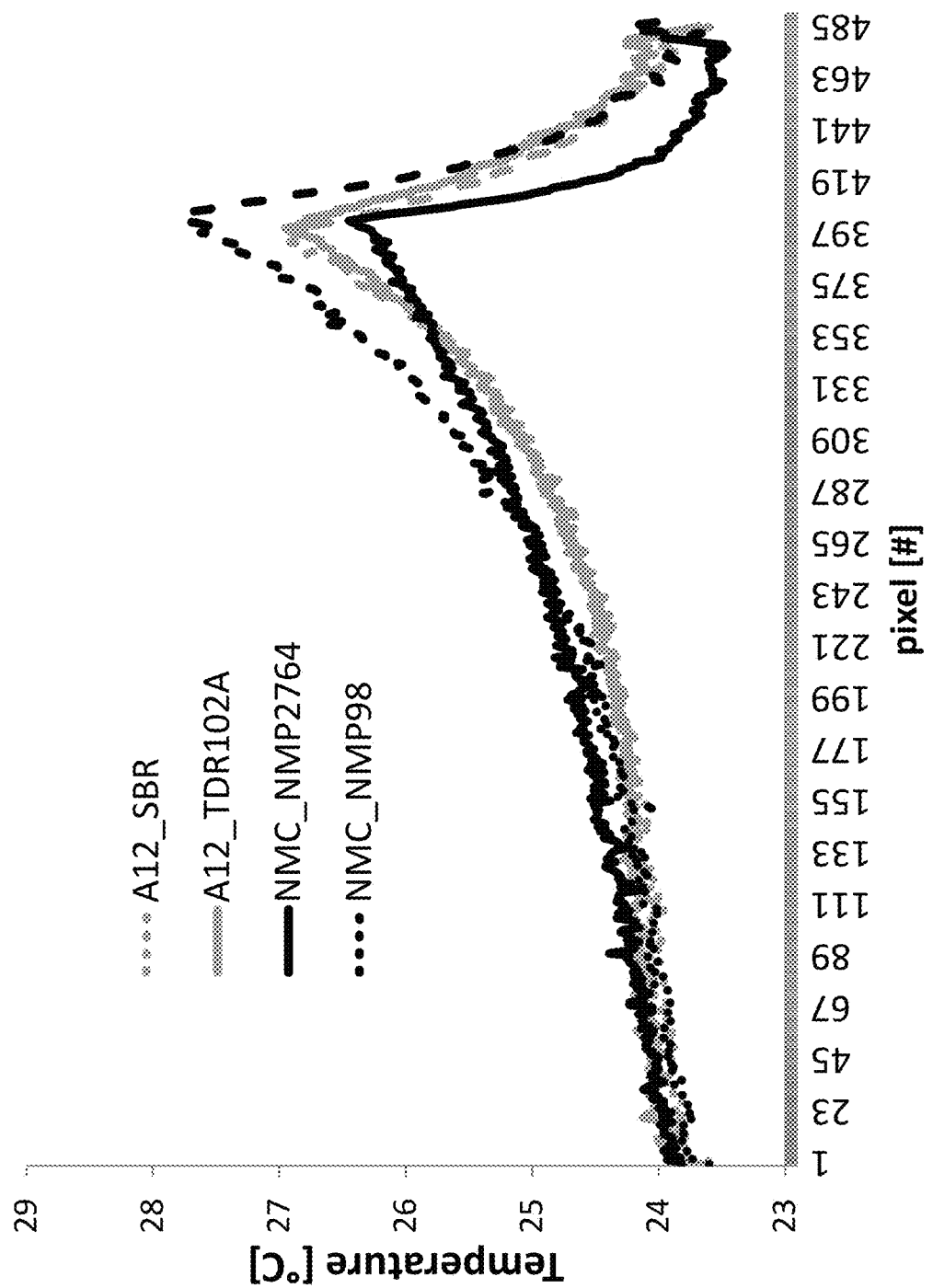

FIG. 18 illustrates examples of temperature decay curves obtained from battery electrodes, after heating them with radiant energy, using a dynamic method, according to embodiments of the present disclosure.

Figure 19:
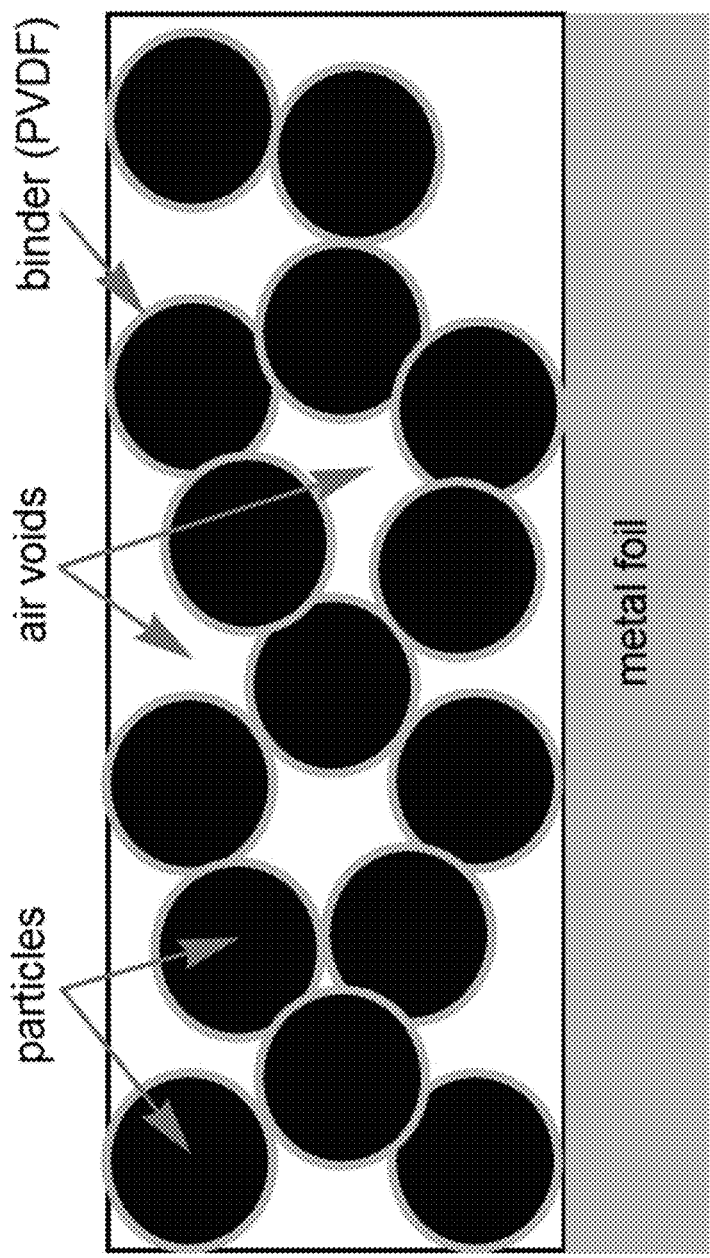

FIG. 19 illustrates the micro-structure of a typical electrode (e.g. film), the basis for a predictive model developed to estimate the effective thermal properties of the film, according to embodiments of the present disclosure.

Figure 20:
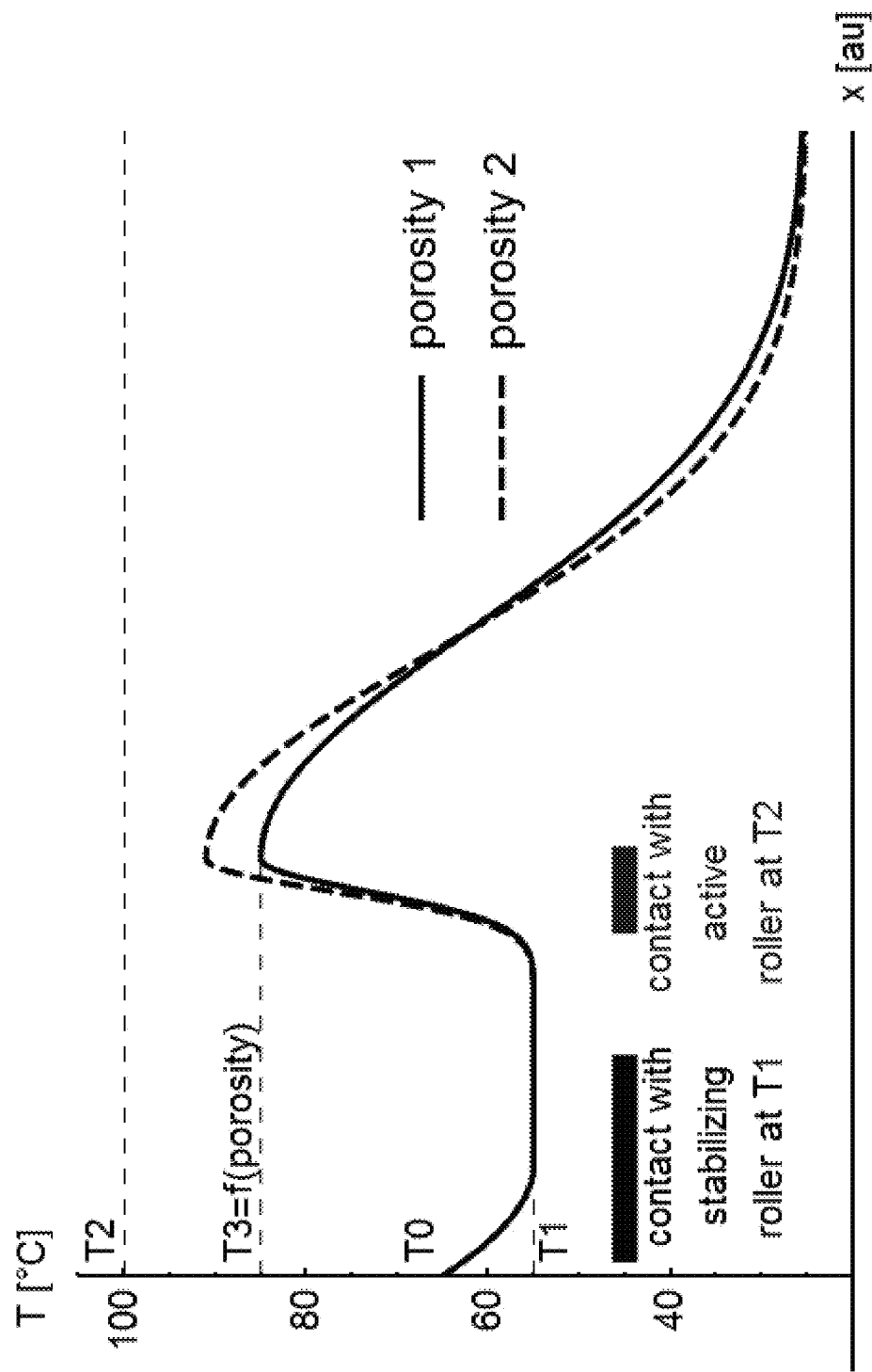

FIG. 20 illustrates the predicted thermal response of a film having a structure similar to that illustrated in FIG. 19, using a model developed according to embodiments of the present disclosure.

Figure 21A:
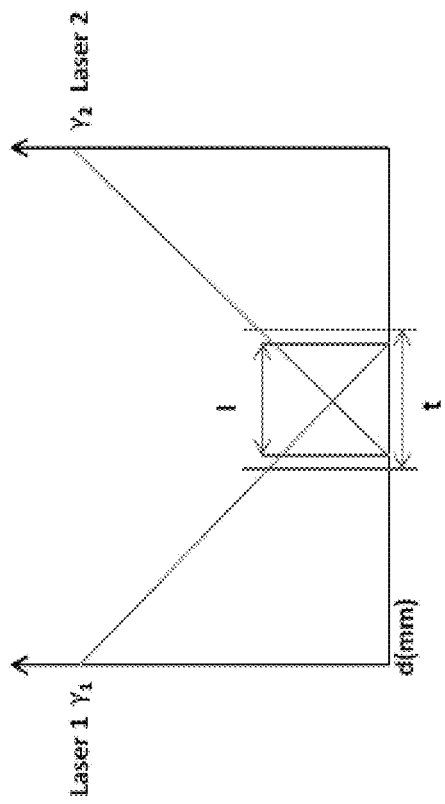
Figure 21B:
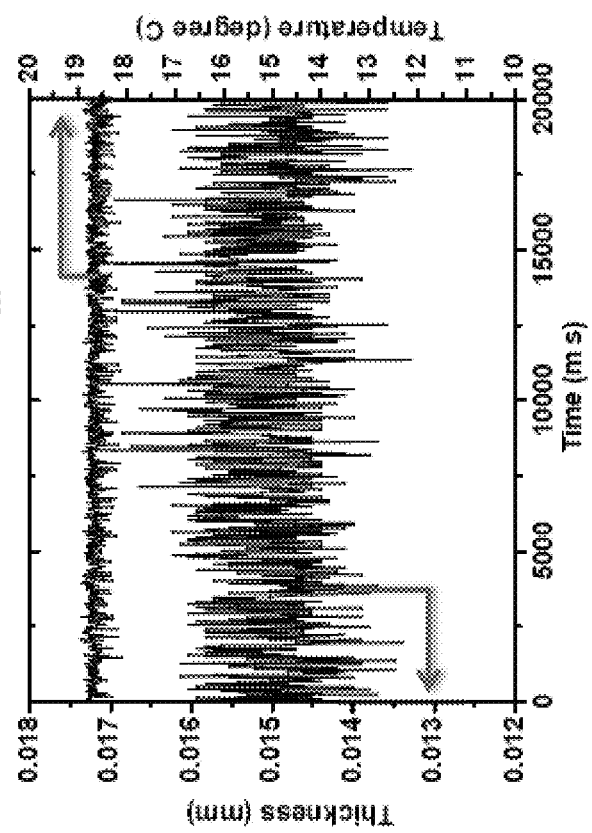

FIG. 21a illustrates a dual laser caliper system for in-line thickness measurement of an (electrode) coating on a substrate of known thickness, according to embodiments of the present disclosure. FIG. 21b illustrates measured thickness values for a bare Al foil substrate, according to embodiments of the present disclosure.

Figure 22:
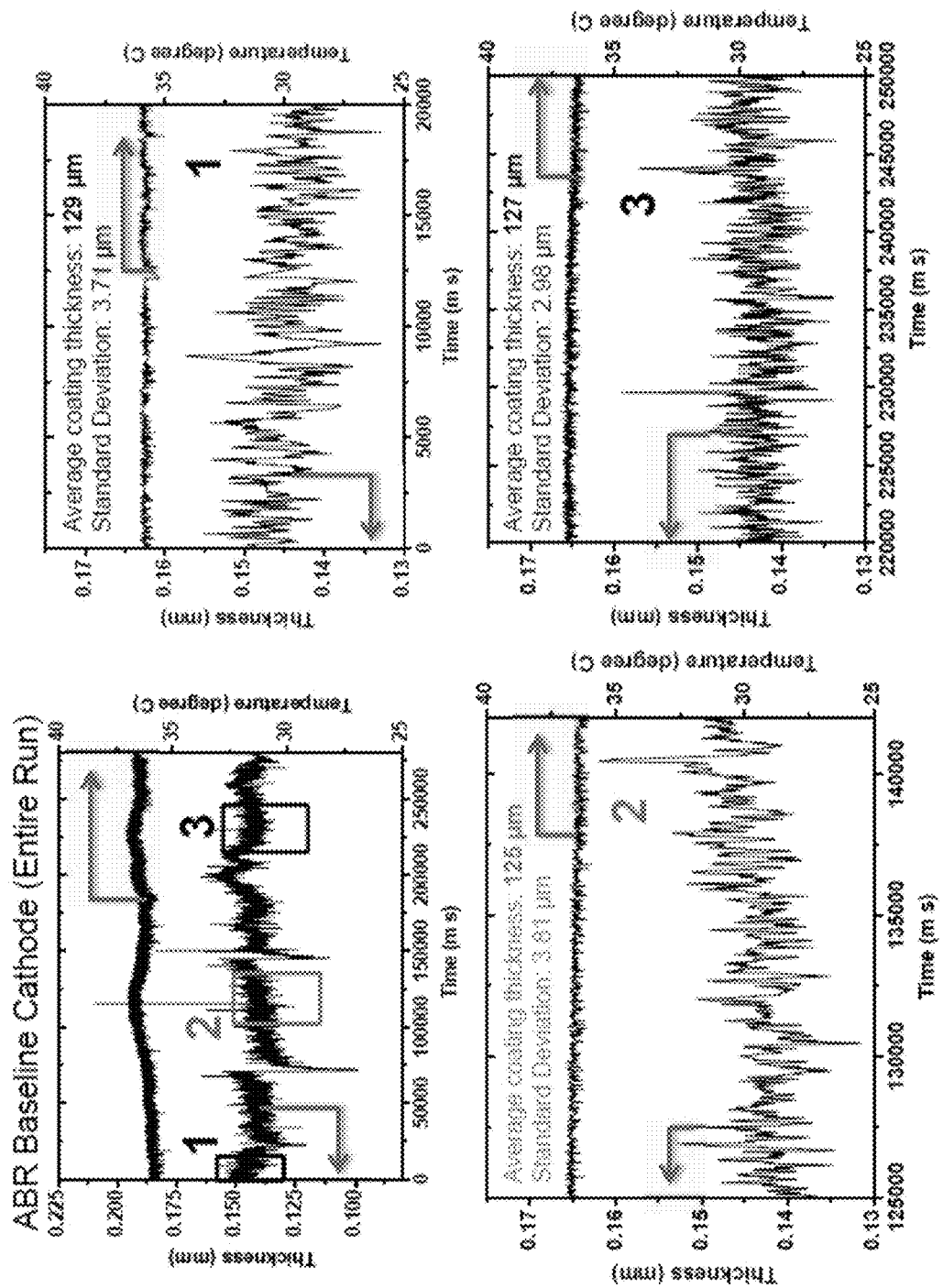

FIG. 22 illustrates data from initial electrode coating trials "1", "2", and "3" for a wet lithium-ion battery cathode dispersion (90 wt % $LiNi_{0.5}Mn_{0.3}Co_{0.2}O_2$, 5 wt % carbon black, and 5 wt % polyvinylidene fluoride (PVDF)) deposited onto Al foil, according to embodiments of the present disclosure.

Figure 23B:
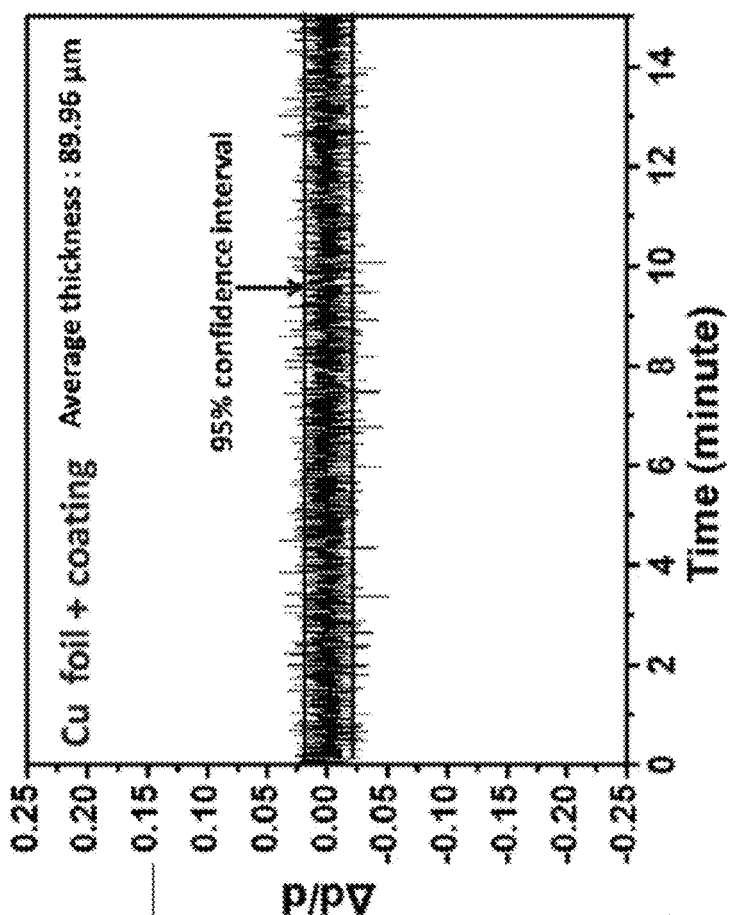
Figure 23A:
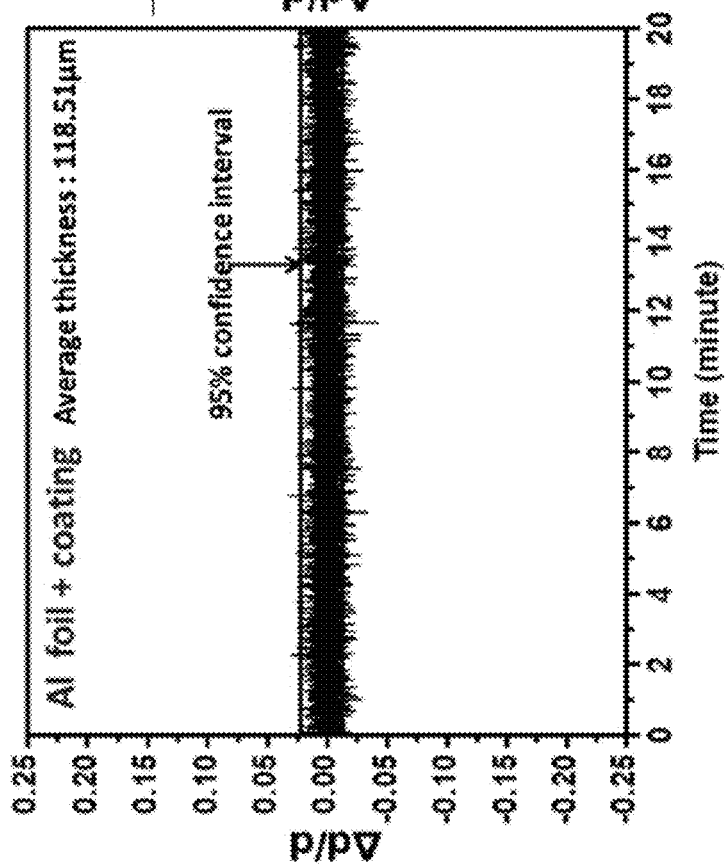

FIGS. 23a and 23b illustrate measured coating variation after coating deposition optimization for a lithium-ion battery cathode (FIG. 23a) on Al foil and anode (FIG. 23b) on Cu foil, according to embodiments of the present disclosure.

REFERENCE NUMBERS

102 . . . first layer
104 . . . second layer
110 . . . energy input
120 . . . thermal response
200 . . . radiation source
210 . . . resistive heating element
220 . . . reflector
230 . . . modified portion
240 . . . unmodified portion 250 . . . reflector opening
320 . . . pore thermal resistance
325 . . . bulk solid thermal resistance
327 . . . overall thermal resistance
330 . . . bulk solid
400 . . . detector
410 . . . heated roller
420 . . . stabilizing roller
510 . . . fixed portion of film
520 . . . fixed focal area
530 . . . evaluated portion
700 . . . membrane and/or electrode
702 . . . top film
704 . . . bottom film
710 . . . glass rod
720 . . . glass rod
800 . . . temperature map
810 . . . temperature curve
820 . . . high temperature region
830 . . . membrane centerline
740 . . . lens
1000 . . . temperature map
1010 . . . temperature curve
1020 . . . high temperature region
1030 . . . membrane centerline

DETAILED DESCRIPTION

Figure 1:
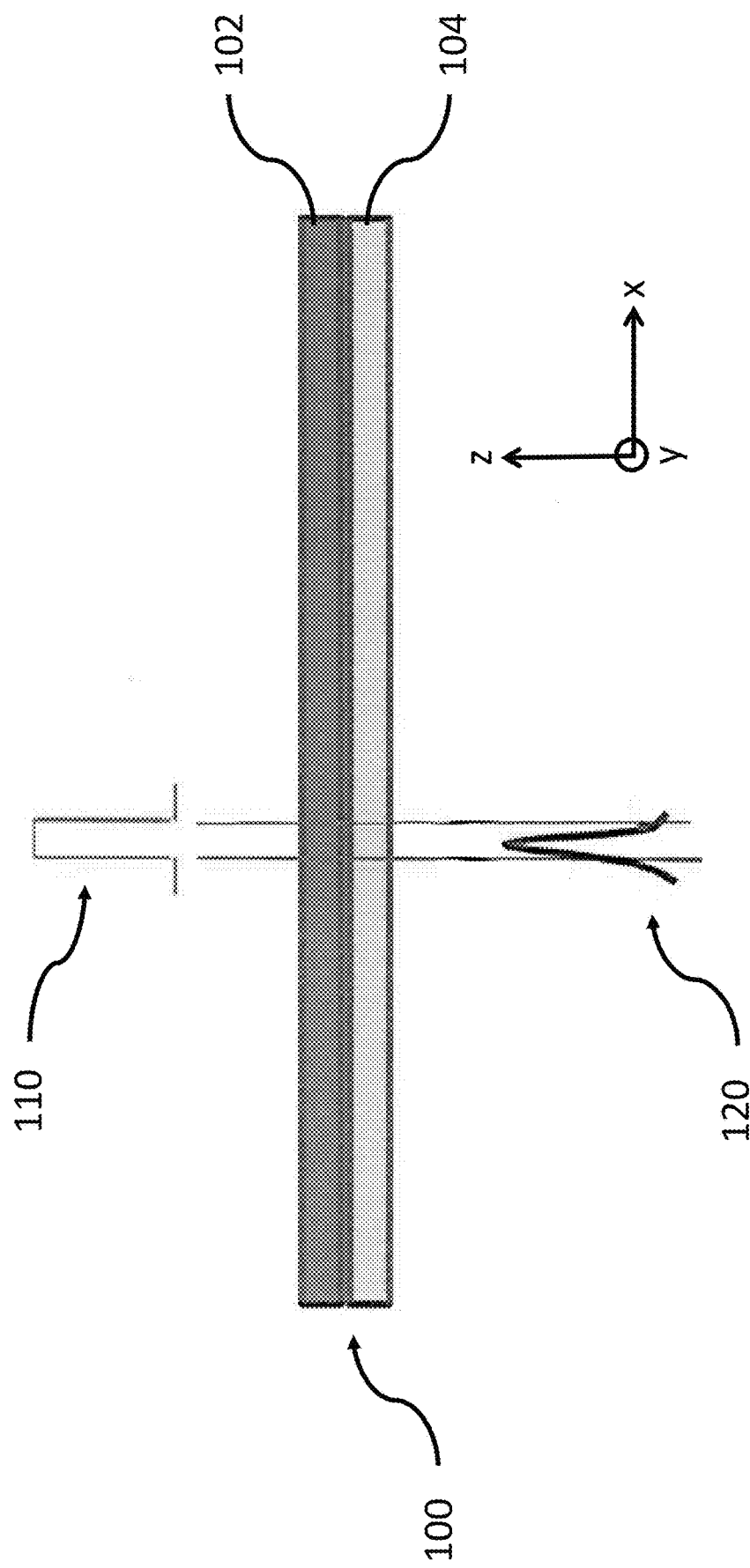

FIG. 1 illustrates an embodiment of the present disclosure where a film 100, in this case a multilayer film, is exposed to an energy input 110, which results in a thermal response 120, such as a temperature distribution. The film 100 may include two or more layers in a laminated form, where the individual layers may be in direct physical contact with one another and/or may be adhered together using an intervening adhesive and/or some other binding material. FIG. 1 illustrates an example of a film 100 having a first layer 102 and a second layer 104. Further examples of multilayer films include coated films, and any other material constructed from more than one individual layer of different materials where the layers are placed in direct physical contact with one another and/or held together by a suitable binder and/or adhesive. The film 100 may also be a single layer of material. Thus, the material exposed to the energy input 110 may be a membrane, a film, an electrode, a sheet, a web, and/or any other substantially planar material defined by a thickness that is substantially less than the length and width dimensions of the material. In addition, the film 100 may be a single, continuous sheet of material, or it may be a single discrete sheet and/or a plurality of discrete sheets, such that each individual sheet may be evaluated in a sequential order. Some examples of materials that may be tested by embodiments of the present disclosure include various composite systems, such as graphite-polymer composite sheets, metal matrix composites, foams, porous polymers, porous ceramics, porous metals (e.g. solids with significant air content), powder sintered metals, and/or powder sintered ceramics. Other films that may be tested or evaluated by methods described herein include filters and ion exchange membranes. In some embodiments of the present disclosure, the films evaluated and/or tested may be battery electrodes, fuel cell electrodes, battery separators, and/or fuel cell membranes. Other films that may be evaluated using embodiments of the present disclosure may include photovoltaic (PV) materials and/or photovoltaic devices on rigid and/or flexible substrates. Examples of PV materials include CdTe films, $CuInGaSe_2$ films, silicon wafers, PV substrates (e.g. glass, metal, plastic, etc.), transparent conducting oxide (TCO) films, and/or contact layers (e.g. metal foils). Still further examples of films that may be tested by some of the embodiments of the present disclosure include films coated with multi-component coatings, for example, carbon particles, metal particles, ceramic particles, metal oxide particles, and/or polymer constituents (e.g. polymer binder materials, ionically conductive polymers, and/or electrically conductive polymers.) The methods described herein may be used to evaluate a film system that includes distinct layers with at least two distinct phases (e.g. two distinct solids, one solid and one liquid, one solid and one gas, etc.).

Although some of the embodiments described herein are directed to films, some of the methods described herein may be used to measure surface characteristics of solid materials having a thickness dimension that may be on the same order of magnitude as, or greater than, the material's width and/or length dimensions. Examples of other solid material shapes, other than flat planar films or sheets, that may be tested by some of the methods described herein include bricks, columns, rods, tubes, and/or pipes. Other examples of materials that may be tested by methods described herein include concrete, ceramics, solid oxides, metal based composites, ceramic based composites, polymer based composites, and/or porous materials.

As shown in FIG. 1, exposing a film 100 to an energy input 110 may create a thermal response 120 in the film 100, which may be specific to and defined by the physical properties of the film 100. For example, the energy input 110 may result in a thermal response 120, such as a measurable temperature difference, temperature change, temperature profile, temperature map, and/or temperature gradient in one or more of the film's three dimensions; e.g. thickness—z-axis, length—x-axis, and width—y-axis (where the circle indicates that the y-axis projects perpendicularly out of the page). Examples of physical properties of a film 100, which may affect the thermal response 120 of the film 100 (e.g. the temperature changes, profiles, gradients, etc.) include thermal conductivity, porosity, thickness, refractive index, extinction coefficient, emissivity, roughness, density, and/or heat capacity. The energy input 110 into the film 100 may occur by at least one of radiant heat transfer (e.g. electromagnetic radiation), convective heat transfer, and/or conductive heat transfer. When in the form of radiant energy transfer (e.g. electromagnetic radiation), the energy input 110 may range from the far-infrared (far-IR) spectrum of light, through the visible spectrum of light, and into and including the ultra-violet (UV) portion of the spectrum. In some embodiments of the present disclosure, a portion of the film 100 may be radiated with radio frequency radiation, microwave radiation, and/or x-ray radiation to provide an energy input 110 to a portion of the film 100 resulting in a thermal response 120 within at least a portion of the film 100.

Figures 2A, 2B, 2C:
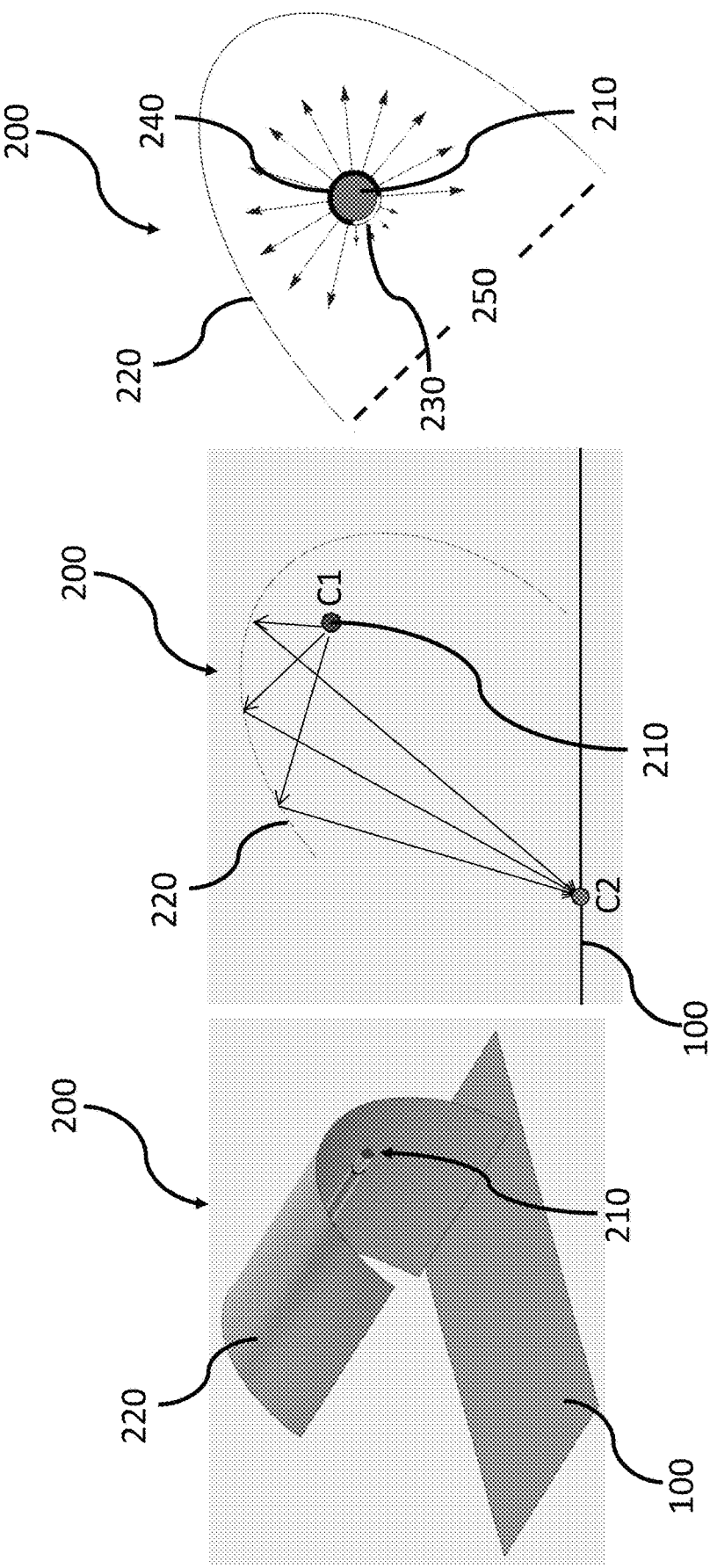

FIGS. 2a, 2b, and 2c illustrate an example of an energy source, a radiation source, which may be used to transfer electromagnetic radiation to a film to induce a temperature change in the film that may be measured and analyzed to estimate one or more physical properties of the film. The radiation source illustrated in these figures provides the following benefits: a) high efficiency radiator (in terms of energy transfer coefficient), b) directed focus of the radiation onto a specific region and/or area of the film, and c) inexpensive. These radiation source designs may deliver an energy input to the film with sufficient energy density to generate a thermal response with sufficient magnitude for the detector (e.g. infrared camera) to be able to detect small physical property changes in the film (e.g. porosity differences). In addition, these radiation source designs are also much simpler than other well-known heat sources such as infrared lamps and higher power lasers. FIGS. 2a and 2b illustrate a radiation source 200 for heating a film 100, where the radiation source 200 includes a resistive heating element 210 and a reflector 220. In some examples, the reflector 220 may be constructed as an aluminum foil having the shape of a portion of an elliptical cylinder. The resistive heating element 210 may be rod-shaped and constructed of materials having low emissivities (e.g. less than about 0.10) such as machined and/or polished steel. However, in general the resistive heating elements selected for the methods described herein have high emissivities (e.g. up to about 0.80) to provide lower operating temperatures for the resistive heating elements.

When in the form of a metal rod, the surface of resistive heating element 210 may be intentionally modified, for example, painted, coated and/or wrapped in a black anodized aluminum foil. As a result, the effective emissivity may be substantially increased, for example to higher than about 0.80, such that when heated, the resistive heating element 210 may release energy mostly through radiation rather than by convection. When rod-shaped, the radiated heat may escape the surface of the black foil positioned on the resistive heating element 210 in a radial fashion in all directions and may not be focused in any particular direction. Thus, focusing of the radiant energy onto the film 100 may be accomplished by the reflector 220 having an elliptical cross-section and made of highly reflective material such as polished aluminum. The hypothetical ellipse that defines the shape of the reflector has two centers. The resistive heating element 210 is located at one of the centers of the ellipse, C1, and the reflected illumination is focused mainly at a focal point, the second center, C2, of the ellipse, as illustrated in FIG. 2b. Thus, positioning the resistive heating element 210 substantially at the ellipse's first center, C1, enables the energy input by the resistive heating element 210 to be substantially focused on the film 100 at the ellipse's second center, C2. For the case where the resistive heating element 210 is rod-shaped, the energy input focal point at C2, will be substantially in the shape of a line and/or rectangular shape that is substantially parallel to the orientation of the rod-shaped resistive heating element 210.

To further improve the efficiency of the resistive heating element, the surface portions of the resistive heating element 210 facing away from the reflector 220 may be modified to reduce the non-focused radiation, as illustrated in FIG. 2c. In this case the bottom left side (e.g. facing away from the reflector 220) of the resistive heating element 210 is modified (polished, painted, coated) to reduce the emissivity of this modified portion 230. As a result, the unmodified portion 240 of the resistive heating element 210 may radiate (e.g. transfer energy) substantially towards the reflector 220 to be subsequently concentrated on and transferred to the film (not shown in FIG. 2c) while simultaneously emitting the non-focused radiation towards the reflector opening 250. Thus, the radiation source 200 design illustrated in FIG. 2c may significantly reduce the amount of non-focused radiation emitted by the radiation source 200, resulting in improved heat-transfer efficiencies. Thus, in some embodiments of the present disclosure a radiation source may be provided where the radiation source may provide about 1 Watt per centimeter width of the film and providing radiation having a wavelength of about 1 μm to about 5 μm at an operating temperature of about 235° C., for a continuous film traveling at a line speed of about 5 feet/second. In addition, the radiation source may be provided in the form of a molybdenum-coated, stainless-steel rod with a diameter of about 0.5 inches and a length of about 14 inches. In addition, the molybdenum-coated, stainless-steel rod may be wrapped with an anodized aluminum foil. For this embodiment, the radiation source was able to increase the average temperature of a film for a battery cathode by about 38° C. relative to ambient temperature. A nearly identical embodiment without the aluminum foil raised the temperature of a similar film by about 29° C. This, illustrates that radiation source in the form of an aluminum foil coated rod may result in improved temperature responses in the film being evaluated that enables smaller changes in the film's physical properties to be detected.

The design values described above are provided as examples, and other values may be selected depending on the specifics of the film being evaluated and the process conditions. For example a radiation source may provide about 0.1 Watts per centimeter width of the film to about 10 Watts per centimeter width (W/cm) of the film. In some cases, the power provided by a radiation source, in terms of W/cm, may be directly proportional to the process line speed. In some embodiments of the present disclosure, a radiation source may operate at a temperature of about 100° C. to about 1000° C. In some embodiments of the present disclosure, a radiation source may operate at a temperature of about 200° C. to about 500° C. In some embodiments of the present disclosure, a radiation source may be in the form of a rod, a cylinder, a filament, and/or any other suitable geometric shape. A radiation source may include a central core that is covered with an outer coating. A radiation source may include a central core that is wrapped with an outer layer; e.g. aluminum foil. A radiation source may include a central core that is covered with a coating, with an outer layer wrapped around the outer coating.

Referring again to FIG. 1, exposing the film 100 to an energy input 110 (e.g. by radiating a portion with a radiation and/or heat source) may cause a local increase in temperature of at least a portion of the film 100. The energy may then transfer to other portions of the film 100, for example by conductive heat transfer, to cooler portions of the film 100 through the film 100 in the x, y, and/or z dimensions, resulting in a characteristic thermal response 120, such as a temperature change, a temperature distribution, a temperature profile, a temperature map, and/or a temperature gradient within the film 100. This thermal response 120 may be a function of the film's physical properties (or the physical properties of multiple films in the case of a multilayer or laminated material), and may also be affected by radiant and convective heat transfer from the film 100 to the surrounding environment (not shown). For example, significant heat losses to the environment may reduce the magnitude and/or range of temperatures within the film 100, whereas minimizing heat losses may increase the magnitude and/or range of temperatures within the film 100. In some situations, minimizing energy losses from the film 100 to the environment may be desirable to increase the magnitude and/or range of temperatures within a film being evaluated. However, there may be situations where increasing the energy losses from the film to the environment may be desirable; e.g. to avoid overheating and/or damaging the film. Thus, some embodiments of the present disclosure may include a means for providing active cooling to the film, after energy has been transferred to the film by a radiation source. Examples of a means for providing active cooling include blowers, fans, and/or direct contact with a cooled surface (e.g. a cooled roller).

Regardless, the energy input 110 into the film 100 may distribute through the film 100 and/or be transferred from the film 100, such that the film 100 may reach a steady-state equilibrium temperature, a steady-state temperature profile, a steady-state temperature map, and/or a steady-state temperature gradient. In the case where only a transient, discrete amount of energy (e.g. pulsed) is supplied to the film 100, the film 100 may briefly experience a transient rise in temperature, followed by a slow transient decay in temperature to a final equilibrium temperature approximately equal to the temperature of the surrounding environment. In the case, where energy input 110 is supplied to the film 100 in a continuous fashion, for example when evaluating a continuously moving film (e.g. web), the film 100 may also reach a steady-state equilibrium temperature, a steady-state temperature profile, and/or a steady-state temperature gradient (all examples of a thermal response 120), where the energy supplied to the film 100 may be essentially equal to the energy losses from the film 100 to the surrounding environment (not shown). However, it should be noted for the continuous film and continuous monitoring embodiments of the disclosure, a steady-state equilibrium temperature, a steady-state temperature profile, a steady-state heat-map, and/or a steady-state temperature gradient, etc. is generally only obtained when the process conditions are unchanging and the film's physical properties are unchanging. Contrary to this, a changing temperature metric, while the process conditions are at steady-state (e.g. line speed, power input, radiation source and camera positions, etc.), indicates a non-steady state condition of the film (e.g. changing density, porosity, thermal conductivity, etc.)

In either static or dynamic situations, time may be an additional independent variable that may need to be balanced with other design criteria that define the system (e.g. the film properties, energy input properties, etc.). In some cases, a time component may be defined, at least partially, by a distance component. For example, for a continuous process where the film 100 is in the form of a continuous web and is being transported through a manufacturing line at a fixed line speed (e.g. feet/second), the time between exposing the film 100 to an energy input 110 and the time that a thermal response 120 is measured, may be determined by a line speed (e.g. how fast a continuous film is moving in the x direction relative to a fixed energy source and a fixed detector) and the distance between the energy source and the detector. The time interval from exposure to response may be calculated by dividing the distance between the energy input source (e.g. a lamp) and the response measurement device (e.g. a camera) by the line speed. In other words, a radiation source may be directed towards a first fixed location and/or area in space, where the detector is also directed towards the same first fixed location and/or area in space. In this example, the detector may detect the maximum temperatures achieved in the film, as no time (or only negligible time) is allowed to elapse from the point in time of transferring energy to the film, to the point in time of measuring the temperature response. Alternatively, (or in addition to for the case of more than one detector) the detector may be directed towards a second fixed location and/or area in space that is different from the first fixed location. In this example, for the case of continuous process, the portion of the film heated will have a finite period of time to cool after it has been heated and before it is evaluated by the detector. This period of time is simply the distance between radiated area of the film and the position of the detector's field of view divided by the line speed.

For static systems, the magnitude of the energy input 110 (e.g. energy input/time; e.g. watts) and/or the time period of exposing the film to the energy input 110 may be adjusted as needed to provide a detectable temperature change in the film 100, whereas too much energy input 110 into the film, for example by too high a magnitude of the energy input 110 and/or for time intervals that are too long may result in excessively rapid temperature increases that may, for example, saturate the detector, minimize temperature gradients, and/or deform/damage the film. For dynamic methods where the film 100 may be continuously moving relative to a fixed energy source (e.g. that provides the energy input 110) and fixed detector (e.g. camera), the line speed and detector position relative to the energy source may need to be optimized with the heat transfer rates through the film 100 and heat transfer rates from the film 100 to the environment to allow a measurable thermal response 120 (e.g. temperature gradient and/or temperature profile) to form downstream of the energy input 110.

The principles just described may be utilized to determine a characteristic physical property of the film 100, provided a sufficient number of the system's independent variables are defined and/or known, where "system" is defined as the film the radiation source, the detector, etc. For example, if the energy input 110 into the film 100 is known, and the thermal response 120 can be measured and quantified, and enough of the film's physical properties are known, the system's mass and energy balance may be solved for an unknown physical property of the film 100. In some embodiments of the present disclosure, the thermal response 120 and the known (or assumed) physical property variables of the film 100 may be correlated to and used to estimate the thermal conductivity of the film 100. Further, since a material's thermal conductivity depends upon the material's internal structure, these data may be used to determine the material's porosity. Porosity is of significant importance to the performance of many films, membranes, and electrodes used in industry, including filters, ion-exchange membranes, battery electrodes, and fuel cell electrodes.

Figure 3:
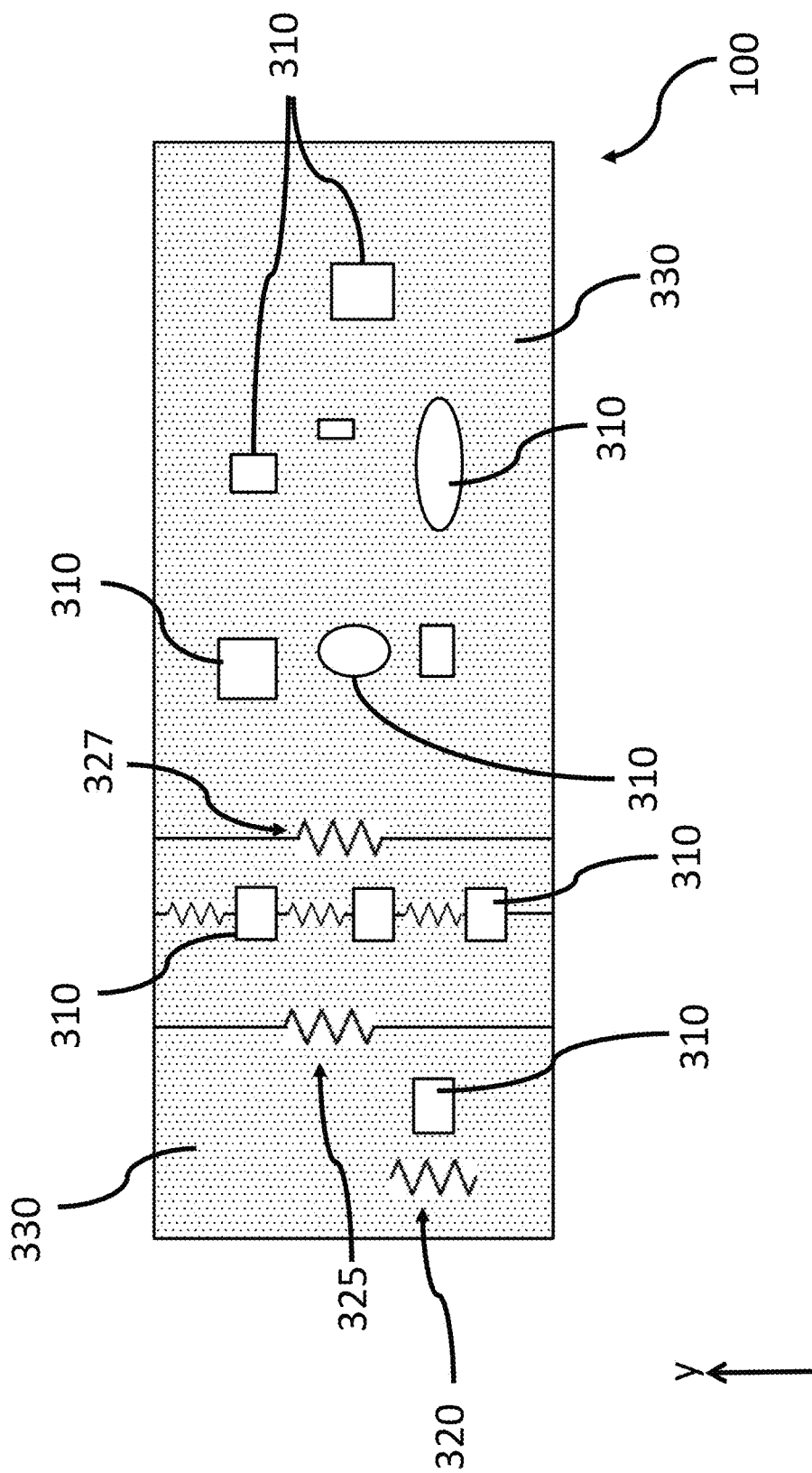
FIG. 3 illustrates a model constructed by thermal resistance elements to represent pores or low density areas (or volumes) within a bulk solid of a film, membrane, or electrode, according to embodiments of the present disclosure.

One method of correlating the thermal response of the film to a known energy input and a characteristic (e.g. physical property) of the film may include a mathematical resistance model, as illustrated in FIG. 3. This example of a model shows that heat transfer (e.g. by conductive heat transfer) within a film 100 may be expressed in terms of a network of thermal resistances. The film 100 may be represented as a plurality of pores 310 within a bulk solid 330 (e.g. a matrix). In this example, the pores 310 may be holes within the bulk solid 330 of the film 100, such that the pores 310 may completely penetrate the entire thickness of the membrane 100 and/or may only partially penetrate the thickness to form divots, pockmarks, or some other kind of surface depression, recess and/or cavity within the bulk solid 330. In other cases, the pores 310 may penetrate through the bulk solid 330 of the film 100 in irregular shapes that vary in all three dimensions (e.g. x, y, and/or z). The empty space created by the pores 310 may be filled with a gas such as air and/or may be completely or nearly devoid of gas (e.g. at a vacuum). Examples of materials that may include gas-filled pores include porous polymers, porous metals, foams, filtration membranes, and electrode films for batteries and/or hydrogen fuel cells. However, in other examples, the space defined by the pores 310, instead of being filled with gas, may be substantially filled with at least one additional solid that differs (e.g. density and/or composition) from the bulk solid 330, and/or the space of one or more pores 310 may be filled with a liquid. In still further examples, the film 100 may contain bubbles within the thickness of the film 100, where the bubbles may be filled with a gas and/or the internal void of the bubbles may be under vacuum.

Therefore, a pore 310 may also be defined as an area of lower density material that is not a gas, e.g. a solid and/or a liquid, relative to a surrounding higher density bulk solid 330. Examples of materials that may include one or more different solid and/or liquid phases include graphite-polymer composite sheets, metal matrix composites, and powder sintered metals. Therefore, in some embodiments of the present disclosure, a film evaluated by some of the methods described herein may include one or more layers of material, such that each layer may be constructed from one or more specific phases of material (e.g. solids, liquids, and/or gases), wherein one or more phases may be dispersed throughout a bulk solid matrix phase.

Referring again to FIG. 3, a pore 310 (where a pore may be defined by an area or volume defined by at least one physical property substantially different from the surrounding bulk solid) with a lower density than the surrounding bulk solid 330 may be have a higher thermal resistance 320 relative to the thermal resistance 325 of the surrounding bulk solid 330. Since resistance is the inverse of conductivity (e.g. conductivity=1/resistance), an empty pore 310 or a volume with a lower density than the surrounding bulk solid 330 may also have a lower thermal conductivity. Therefore, the presence of pores (or lower density areas) 310 within a bulk solid 330 may increase the overall thermal resistance of the film (or decrease the thermal conductivity). For example, an overall thermal resistance 327 may be calculated as the sum of a number of thermal resistances in series, e.g. pore thermal resistances 320 and bulk solid thermal resistances 325. Thus, for a defined amount of energy input into the film 100 (e.g. by radiant heat transfer), a film 100 with pores 310 may be less capable of conducting heat through the surrounding bulk solid 330 than a film 100 constructed from the same bulk solid 330 but without pores 310. As a result, the film 100 with pores 310 that is exposed to an energy input (e.g. radiant) may demonstrate a significantly different change in temperature, temperature range, temperature gradient, and/or temperature profile than the thermal response demonstrated by a film 100 constructed from the same bulk solid 330 material without pores 310.

Areas of significant differences in density within a film may also significantly affect other physical properties of the film, for example the optical reflectivity of a film. In addition, surface roughness may also affect the optical reflectivity of a film. These relationships may be correlated to the energy input entered into the film and the thermal response resulting from the energy input, thus enabling prediction of various film characteristics based on these factors (e.g. energy input and thermal response). In addition to porosity, other material physical properties that may be estimated by such techniques include thickness, density, solid loading, composition, morphology, emissivity, convection coefficient, and volume fraction (e.g. volume fraction of a given phase). The methods described herein may also be used to estimate material microstructure characteristics and defect densities.

As described above, some embodiments of the present disclosure may apply energy to a film by utilizing electromagnetic radiation. Other embodiments of the present disclosure may transfer energy to a film by convective heat transfer and/or conductive heat transfer. For example, a resistive heating element may be heated to an elevated temperature, for example by applying a voltage across the resistive heating element. The heating element may then be positioned in direct physical contact with a portion of a surface of the film being evaluated, resulting in conductive heat transfer from the resistive heating element to the film, resulting in a thermal response within and/or on the film. For a continuous process, a heating element (e.g. a heated roller) may be positioned substantially perpendicular to a flow path of the film, such that as the film moves down the manufacturing line, it may be brought briefly into direct physical contact with the heating element, resulting in conductive heat transfer from the heating element to the film, resulting in a thermal response within and/or on the film.

Alternatively, a heating element may be placed immediately next to, but not in direct contact with the film, such that a combination of radiant heat transfer and convective heat transfer may occur from the heating element to the film, resulting in a thermal response within and/or on the film. In yet another embodiment of the present disclosure, a hot stream of gas may be directed towards a portion of a surface of the film, resulting in convective heat transfer from the gas to the film, resulting in a thermal response within and/or on the film.

As described above, in some embodiments of the present disclosure, energy may be transferred to the film by transferring energy to a portion of a surface of the film, where the portion may be described by an essentially one-dimensional line or curve, or by a two-dimensional shape, such as a rectangle, a square, a circle, an oval, and/or any other suitable two-dimensional shape. In some embodiments of the present disclosure, the shape of the portion of the surface of the film where radiant energy transfer occurs may be defined by a focusing lens and/or a mechanical obstructing window and/or slit. In the case of convective heat transfer using a hot gas, the shape of the portion of the surface of the film where convective energy transfer occurs may be defined by the shape of a pipe, window, duct opening, slot, slit, and/or nozzle. In the case of conductive heat transfer using for example a resistive heating element, the shape of the portion of the surface of the film where conductive energy transfer occurs may be defined by the shape of the resistive heating element used to heat the film and/or the shape of the contact region between the resistive heating element and the film.

Figure 4B:
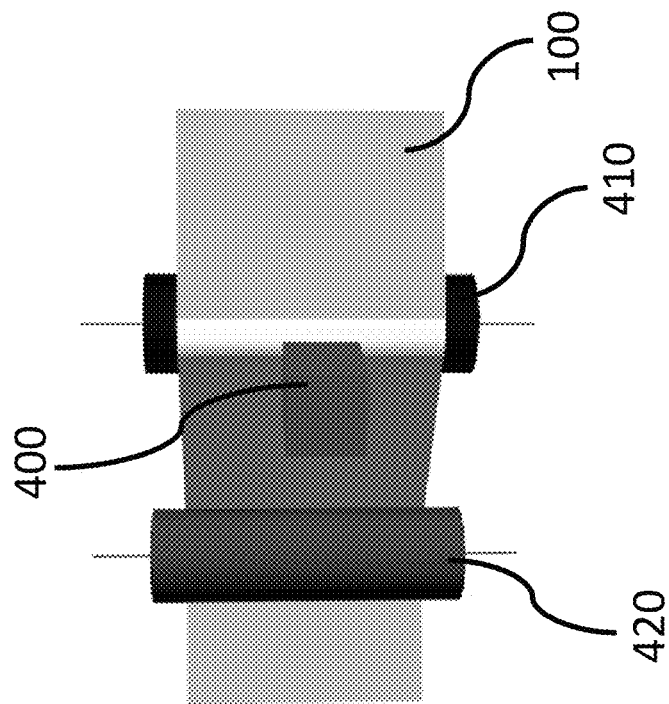
FIGS. 4a and 4b illustrate a system for evaluating the physical properties of a continuous film that utilizes a heated roller and a stabilizing roller, according to embodiments of the present disclosure.
Figure 4A:
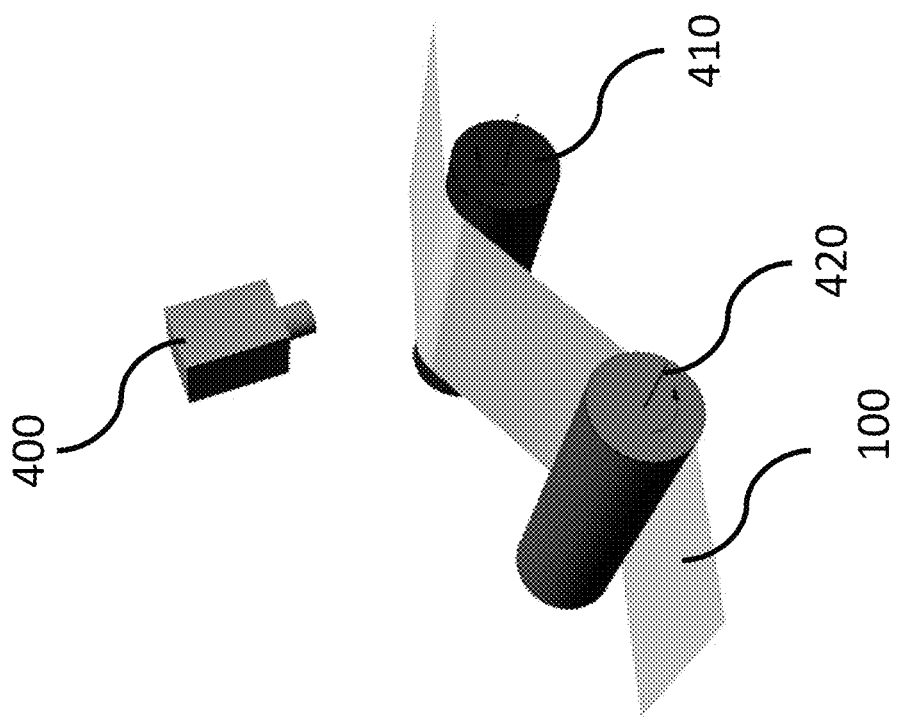

As described above, in some embodiments of the present disclosure, thermal energy may be transferred to a film using a heated roller. Examples of heated rollers 410 for transferring thermal energy to a film 100 are illustrated in FIGS. 4a and 4b. These figures illustrate an example where heat from a heated roller 410 may be transferred to a continuous film 100 (e.g. web) resulting in a temperature increase in at least a portion of the continuous film 100, which may subsequently be recorded by a detector 400 (e.g. infra-red camera) positioned over the continuous film 100. Then, using previously established calibration data, curves, and/or models (described below), the temperature measured by the detector 400 may be converted to at least one physical property of the film 100 (e.g. example porosity, thickness, composition, thermal conductivity, and/or heat capacity, etc.). Thus, a heated roller 410 to provide heat transfer to the film 100 may allow for an easy implementation of quality control and/or monitoring functions that may be installed in-line in high throughput roll-to-roll production processes, including multilayer battery electrode or PEM fuel cell components production processes.

In addition to the heated roller 410 and the detector 400, FIGS. 4a and 4b also illustrate an optional stabilizing roller 420. A stabilizing roller 420 may be needed in some applications to assist with stabilizing the temperature of the continuous film 100 (e.g. web) before being heated by the heated roller 410. For example, a stabilizing roller 410 may be desired in a process where a monitoring system is installed at the end of a die coater, at which point the continuous film 100 may be at an undefined temperature and/or at a temperature significantly higher than ambient temperature and/or a set-point temperature targeted by the heated roller 410. Thus, in some situations, a stabilizing cylinder 420 may be used as a cooling cylinder to lower the temperature of the film to an acceptably low temperature, e.g. closer to ambient, to enable the heated roller 410 to affect a sufficiently large and/or meaningful temperature increase to the film to obtain a satisfactory measurement of the one or more film's physical property. However, it should be noted, that not all processes and/or applications will need a stabilizing roller. For example, this would be the case when the film 100 is already at or close to the desired starting temperature (e.g. close to ambient temperature) before being heated by the heated roller 410. In addition, there may be continuous processes that utilize a heated roller in conjunction with one or more additional rollers; e.g. one or more stabilizing, heating, cooling, rollers etc.

The method for evaluating a characteristic of a film may be configured for batch or semi-batch operation, where the film may be described as a single sheet that remains essentially stationary relative to at least one fixed energy source and/or at least one fixed thermal detector. However, the method for evaluating a characteristic of a film may be configured for continuous operation, where the film may be described as a plurality of discrete sheets and/or a continuous web that moves relative to at least one fixed energy source and/or at least one fixed thermal detector. Some examples of continuous manufacturing processes where the methods described herein may be used include roll-to-roll processes, belt-fed processes, conveyor processes, and float processes (e.g. float glass).

The films tested may be implemented in continuous processes with production speeds (e.g. line speeds) ranging from about 0.5 ft/min to about 100 ft/min. In other cases production speeds may range from about 0.5 ft/min to about 20 ft/min. In still further embodiments, production speeds may be significantly faster than 100 ft/min. An energy input into a film may result in a temperature rise of a portion of the film ranging from about +0.01° C. to about +500° C. In other cases, an energy input into a film may result in a temperature rise of a portion of the film ranging from about +1° C. to about +50° C. In still further embodiments, an energy input into a film may result in a temperature rise of a portion of the film ranging from about +2° C. to about +6° C.

A thermal response such as a temperature, a temperature change, and/or a rate of change in temperature may be measured using an IR camera. Examples of applicable IR cameras include InSb and microbolometer detectors. In some embodiments, an energy input source may include a light-emitting diode (LED), an IR heater, and/or an IR lamp. An energy source may provide a power output ranging from about 10 watts to about 1000 watts. In other cases, for example at faster line speeds, the power output from an energy source may range from about 100 watts to about 500 watts.

A camera used to measure a film's thermal response may include an image resolution defined by at least one of the detector elements, the field of view of the detector (e.g. IR camera), the size of the film being evaluated, the distance of the detector relative to the film and/or the orientation of the detector relative to the film. For example, an IR camera system with a pixel size of about 0.32 mm×0.32 mm may provide an image resolution of the film's surface of about 1 mm. In other cases, the image resolution of the camera system may range from about 0.01 mm to about 10 mm. In some embodiments of the present disclosure, the detectable image resolution of an IR camera may be optimized by adjusting the power output of the energy source and/or the line speed. For example, higher energy source power outputs may be provided and/or the energy source(s) may be placed closer to the film manufacturing processes having faster line speeds.

Figure 5A:
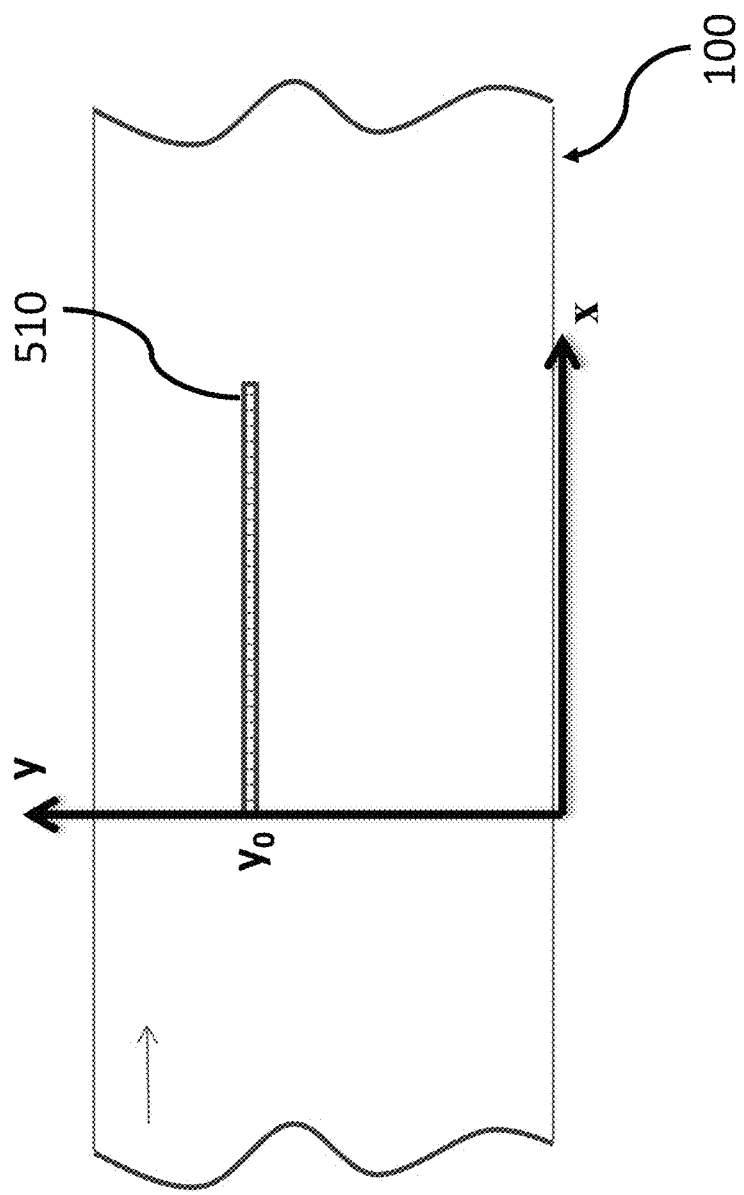

In some embodiments of the present disclosure, correlating a thermal response to a measurement and/or estimate of a physical property of the film (e.g. porosity) may be accomplished using a single point IR detector that is fixed in space, where the single point IR detector evaluates a single fixed point in space on the film's surface. Alternatively a linear IR detector configuration as shown in FIG. 5a may be used. In FIG. 5a, the film 100 moves from left to right, and the thermal response detector (e.g. a camera—not shown) acquires data over a fixed portion 510 in space of the film 100, corresponding to a line of pixels along the x-direction (axis). Alternatively, the thermal response detector may be configured to acquire thermal data of a fixed focal area 520 on the film 100, corresponding to a line of pixels fixed in space along the y-axis, as shown in FIG. 5b. Thus, referring again to FIG. 5a, a detector may acquire thermal data of a film by aligning a linear detector, where the field of view of the linear detector is fixed in space and aligned substantially parallel to the x-axis of the film.

Figure 5D:
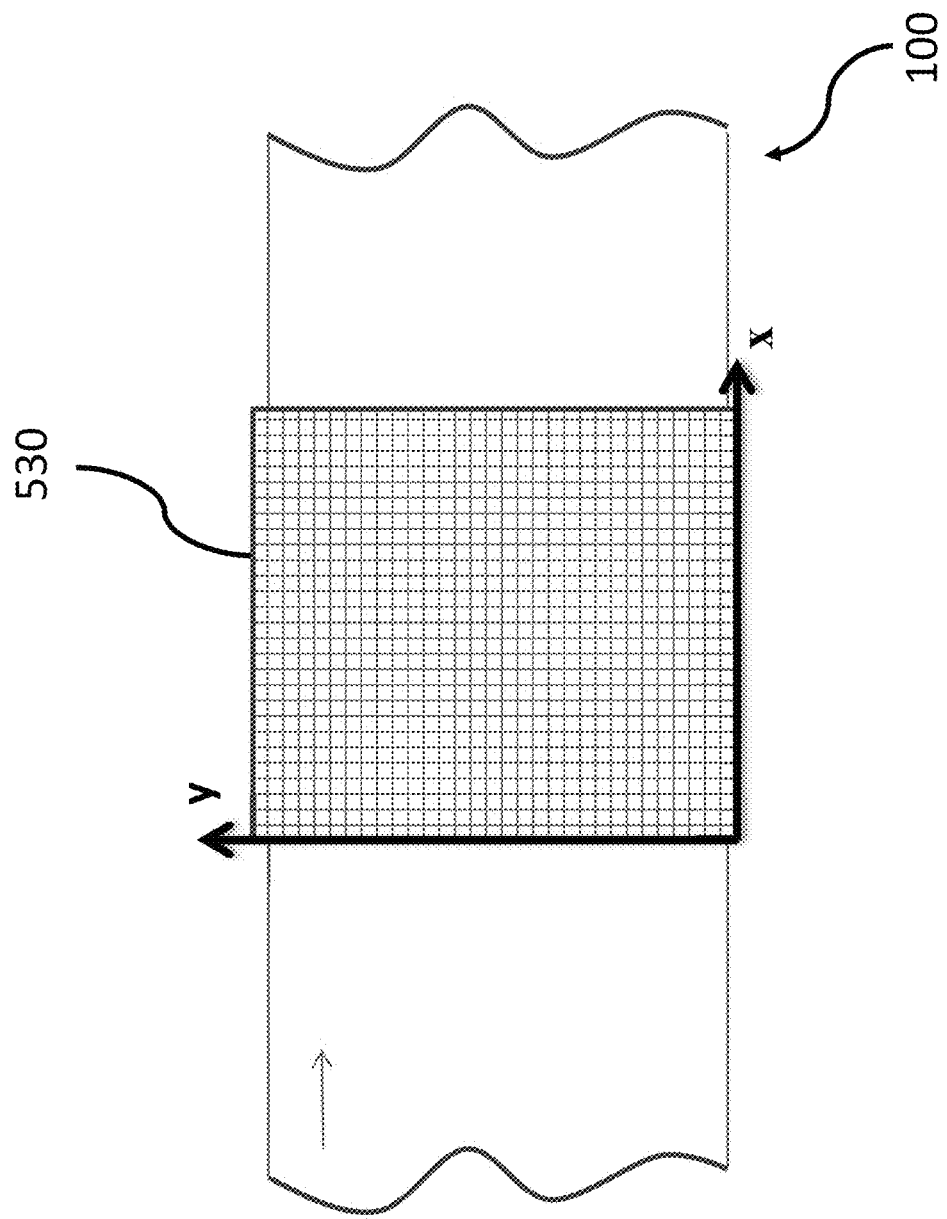

In another embodiment of the present disclosure illustrated in FIG. 5c, a degree of freedom is added to the system, by configuring a linear detector (e.g. IR detector) to move in the y-direction, while remaining fixed in the x-direction, such that the portion of the film evaluated 530 corresponds to a line of pixels fixed in the x-direction, but variable along the y-direction. In yet another embodiment, a thermal response detector (e.g. IR camera) may be provided with a relatively large field of view, where the portion of the surface of the film being evaluated 530 defines a plurality of pixels in both the x-direction and the y-direction, as illustrated in FIG. 5d.

Figure 6A:
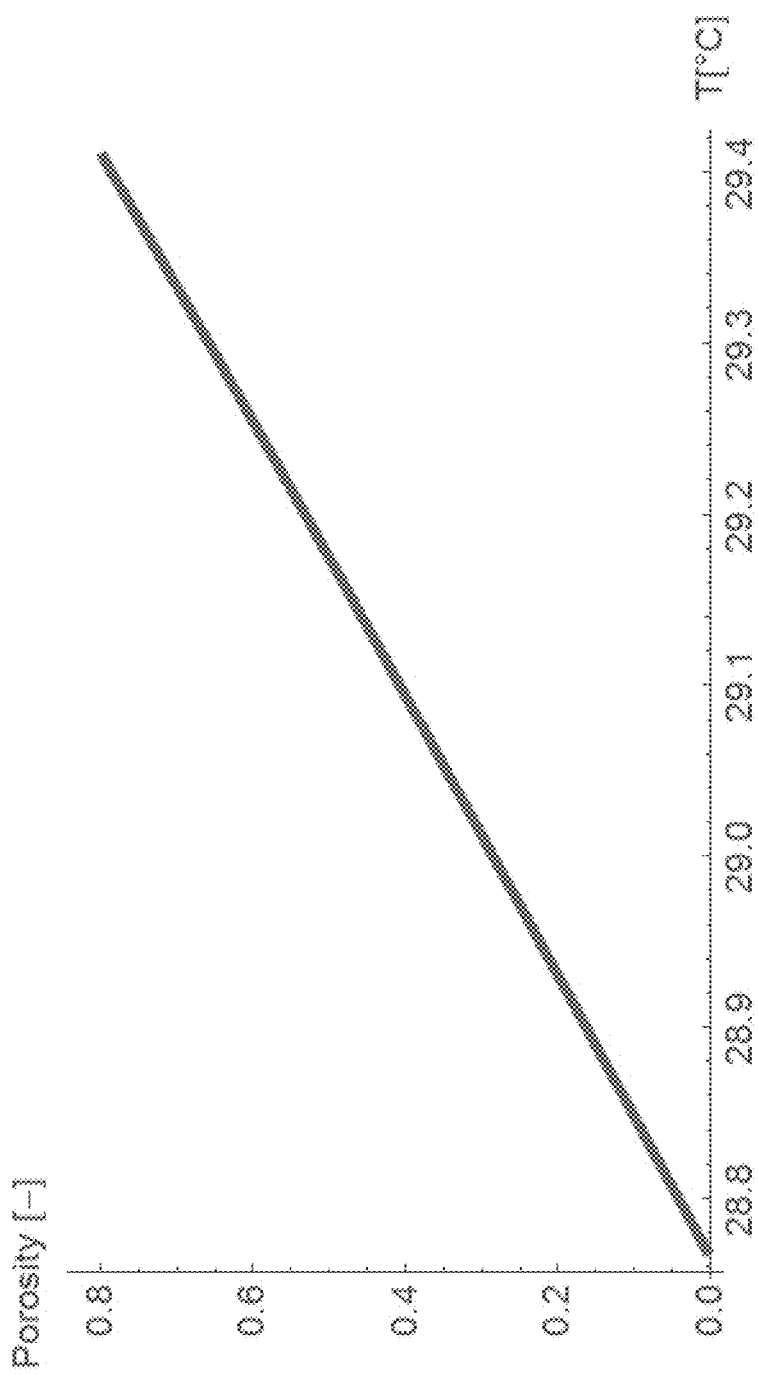
FIG. 6a shows a theoretically derived calibration curve for correlating temperature measurements to a film's porosity, according to embodiments of the present disclosure.
Figure 6B:
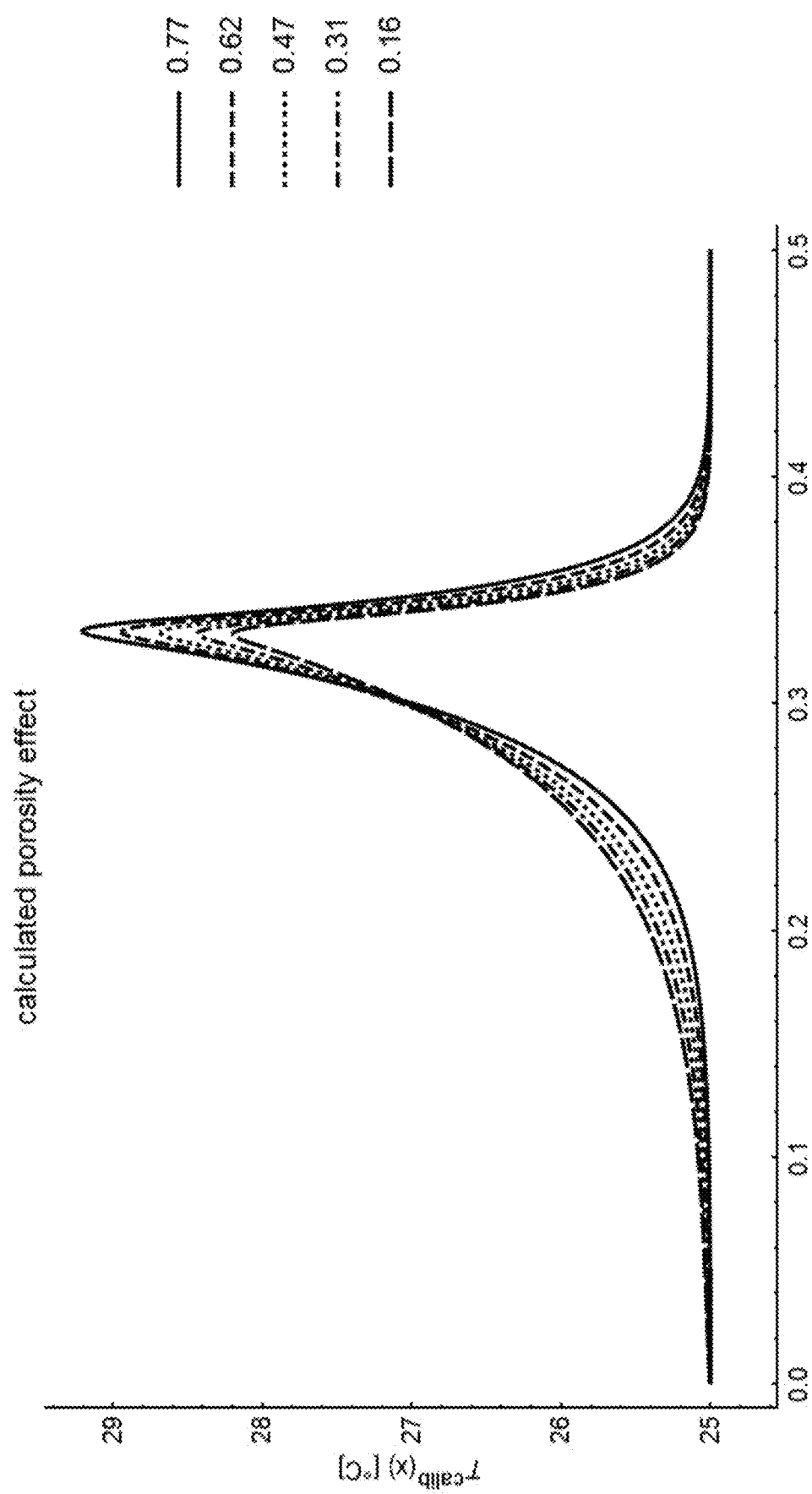
FIG. 6b illustrates measured temperature profiles for several different films constructed with different amounts of a solid layer deposited on a support film, according to embodiments of the present disclosure.

A characteristic of the film, e.g. porosity, may be correlated to a temperature, where all other independent variables are maintained at substantially fixed values; e.g. film materials of construction, thickness, energy input rate (e.g. power), etc. Correlating the film characteristic to a temperature may be achieved by creating a calibration curve like the one shown in FIG. 6a, which in this example correlates film porosity to a measured temperature of the film obtained for a specified set of conditions. FIG. 6b illustrates temperature profiles for specific porosity values of a porous layer on a supporting metallic substrate for varying porosity values (e.g. 0.77, 0.62, 0.47, 0.31, 0.16 [-] As used herein, porosity is defined as the volume of void space divided by the total volume of the film. FIG. 6b clearly shows that the temperature profiles (e.g. thermal response) resulting from energy input into the various films can be used to identify the different porosity values of the porous layer.

In some embodiments of the present disclosure, an infrared camera (e.g. detector) may be used to measure the intensity of radiation emitted by a film that has received an energy input. For example, 2D detector may acquire an intensity image of a surface of the film and/or an intensity video may be taken of the film's surface; e.g. recording a video a specified frame rate (e.g. frames/second or images/second). The detector may then use suitable electronics to digitize the intensity image and/or intensity video to create a temperature map of the film's surface. In some instances, such a conversion process may include defining a user-specified emissivity value. In some embodiments, a gray scale and/or color scale may be introduced to the temperature map, such that the temperature map may be displayed on a monitor and/or screen. In some embodiments, the temperature map corresponding to intensity image and/or intensity video may be evaluated using a predictive model (as described below) to convert the temperature map to a porosity map, density map, and/or any other desirable map of one or more physical properties of the film. In some embodiments, the predictive model may interface with a control system in order to compare the predicted physical properties of the film (e.g. porosity) to quality specifications, alarm set-points, etc. For example, an alarm could automatically activate in situations where one or more predicted porosity values (or some other physical property value of the film) exceeds one or more specified set-points. In addition, an "out-of-control" and/or "out-of-spec" alarm could automatically stop a manufacturing line. In other situations, the predictive model could provide a measured/estimated metric that feeds a feed-back and/or feed-forward control loop that causes adjustments to a process variable that changes the numerical value of the physical property being evaluated. For example, a high porosity measurement from the predictive model could trigger a slowing in the manufacturing line-speed in order to provide a thicker coating of a top layer onto a foil support layer, thus lowering the porosity of the film.

As described above, and illustrated in FIGS. 6a and 6b, methods for evaluating a film to determine one or more physical properties of the film may include a calibration procedure. A calibration procedure may include obtaining calibration curves or profiles where the calibration data may be measured experimentally and/or calculated theoretically by solving the system's energy balance. An experimental calibration procedure may include:
1. preparing film samples with varying physical properties (e.g. porosity),
2. measuring each individual film's thermal response for a particular system setup (e.g. power supply, geometry, line-speed, camera, etc.), and
3. creating a database that defines the relationship between the films' thermal response and the physical property of interest (e.g. porosity).

A theoretical calibration procedure may include:
1. build a micro-scale model that describes the effects of porosity on effective heat conductivity and heat capacity,
2. build a macro-scale model, which describes temperature (e.g. gradients, profiles, etc.) in a moving film subjected to a heat source for a specific system setup (e.g. power supply, geometry, line-speed, camera, etc.),
3. combine the micro and macro scale models into a single model,
4. solve the combined model as a function of porosity, and
5. create a database that defines the relationship between the assumed porosity and resultant temperature distribution; e.g. a calibration model.

After calibrating, the resultant calibration model may be used to evaluate other films and/or estimate the porosity of other films by the following exemplary procedure:
1. measure a thermal response in a film of unknown porosity using the same specific system setup as was used while calibrating,
2. convert the thermal response to an estimate of porosity utilizing the calibration model, and
3. construct 1D and/or 2D porosity map (or other physical property maps) of the film being evaluated.

The resultant porosity estimates (e.g. single value, multiple values and/or 2D map) may then be used for at least one of monitoring, control, and/or diagnostic purposes.

In some embodiments of the present disclosure, a two length-scale model may be utilized to estimate at least one physical property of a film, as a function of a thermal response of the film, caused by an energy input into the film. On a micro-scale level, analytical equations were used that predict effective thermal properties of a top layer of a film (e.g. a coating on an electrode) based on the film's microstructure composition. To describe the system on the macro-level a standing-wave version of the heat equation was applied. By combining the two models, a temperature distribution of the film was predicted as a function of electrode porosity, thickness and type.

Figure 7:
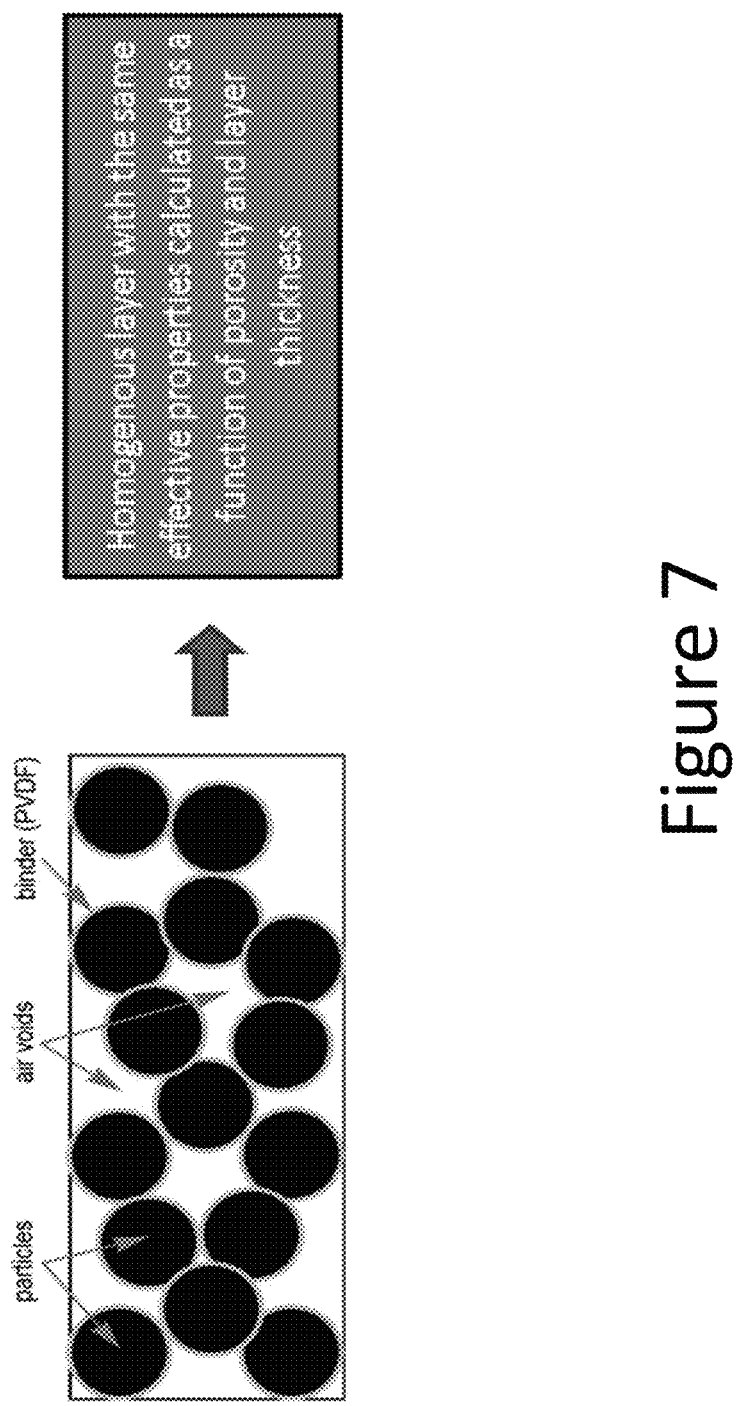
FIG. 7 illustrates a structure of the top layer of a sample battery electrode (e.g. film), which is modeled by a homogenous layer with effective thermal properties using a micro-model, according to embodiments of the present disclosure.

Micro-Scale Modeling of the Top Later of Battery Electrode:

The microstructure of the top layer of the film (e.g. coating on an electrode) is illustrated in FIG. 7. The top layer includes solid particles (two types), polymer binder and air filled voids. The porosity of the top layer is defined as the volume fraction of the air filled voids. The objective of the micro-scale modeling described here was to model the non-homogeneous complex micro-structure of the top layer with a simpler homogenous layer model that on a macro-scale exhibits the same effective thermal behavior as the more complex non-homogeneous top layer. In general thermal behavior is governed by three physical properties; thermal conductivity (K), specific heat capacity ($c_p$) and density ($\rho$). Consequently, these three physical properties need to be calculated based on the physical properties of the constituents $K_i$, $c_{pi}$, $\rho_i$ and their volume ($vf_i$) and weight fractions ($wf_i$), where the index i represents all solid particles, binder, and air voids.

To predict the effective specific heat capacity ($c_p$) and effective density ($\rho$) averaging formulas were used:

$$C_p = \sum_i wf_i \cdot C_{pi}, \text{ and}$$

$$\rho = \left(\sum_i \frac{wf_i}{\rho_i}\right)^{-1}.$$

Figure 8:
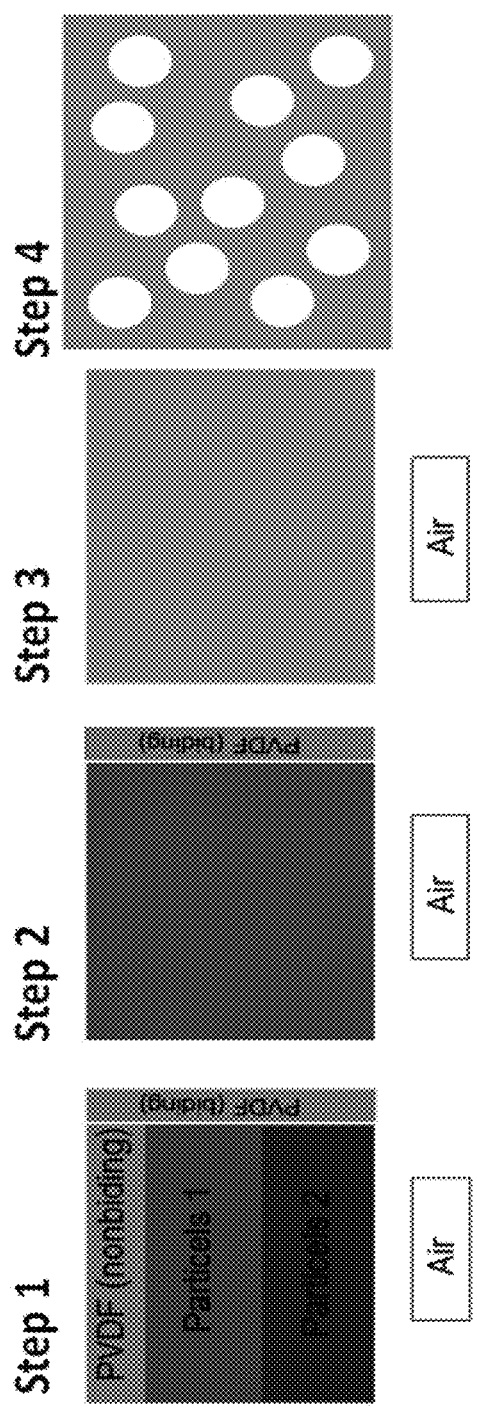
FIG. 8 illustrates a block diagram of a four-step method for estimating the "effective" thermal conductivity of a top layer of a continuous film (e.g. a battery electrode), according to embodiments of the present disclosure.

The effective thermal conductivity K was predicted using a 4 step process that is schematically depicted in FIG. 8 In this process the effective thermal conductivity of all solids is calculated (steps 1-3). Subsequently, air voids are added in step 4 resulting in the final effective thermal conductivity of the composite top layer. Initially it was assumed that the particles and about a 90% fraction of the polymer may be represented by a parallel thermal circuit. Thus, to move from step 1 to step 2 a parallel thermal resistance calculation was performed. Next, the remaining 10% of the polymer was added in a series configuration yielding the effective conductivity of all of the solids ($K_{solids}$). This 10% fraction of the polymer represents the binder sitting between highly conductive particles. Finally, the air filled voids contribution to the effective thermal conductivity was performed in step 4 using an Eshelby-Mori-Tanaka approach. According to this approach, for spherical shaped air voids, the effective thermal conductivity is given by, $$K = \frac{vf_{solids}K_{solids} + vf_{air}K_{air}Tsph}{vf_{solids} + vf_{air}Tsph}$$

where, $$Tsph = \frac{3K_{solids}}{2K_{solids} + K_{air}}.$$

The resultant value for the effective thermal conductivity, K, represents the thermal conductivity that was used as an input parameter for the top layer of the film in the macro model described below.

Figure 9:
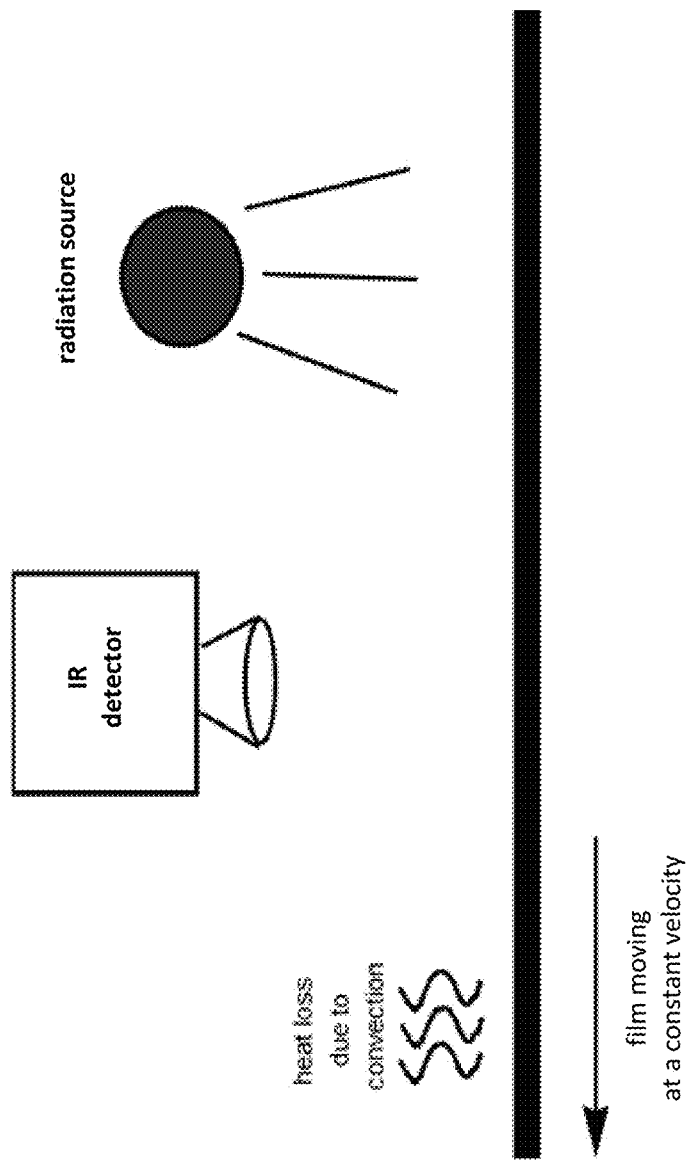
FIG. 9 illustrates a schematic representation of a macro-scale representation of a system for estimating the physical properties of a continuous film, which was used as the basis for a macro-scale model developed as a predictive tool for estimating those physical properties, according to embodiments of the present disclosure.

Macro-Scale Modeling of Thermal Scanner:

Schematically the main components of a thermal scanner are depicted in FIG. 9. To numerically calculate the temperature distribution within a moving film (e.g. battery electrode) the following, so-called "standing wave", form of 2-dimensional (2D) heat equation was used, $$-ux \cdot cp(y) \cdot \rho(y) \cdot \frac{\partial}{\partial x} Y(x, y) - K(y) \cdot \nabla^2_{(x,y)} T(x, y) = 0$$

where ux represents the film speed (e.g. line speed). In the macro model, the film has two layers: the top layer with effective properties calculated as described above for the micro-scale model, and a metal foil at the bottom. The heat equation was solved for the following boundary conditions:

outward heat flow on top: $Q(x)=-hc(T-RT)+Q$source $(x)$ outward heat flow on bottom: $Q(x)=-hc(T-RT)$ $T(0,y)=RT$ $T(L,y)=RT$ where RT denotes room temperature (e.g. about 21° C.), L represents the length of the film, he stands for the convection coefficient and Qsource(x) represents the energy input from the radiation source. In practice Qsource(x) was assumed to be a Gaussian distribution of a prescribed width and height. To numerically solve the heat equation a finite element method was used.

Modeling Results and Comparison with Experiment:

The above described methodology has been applied to predict thermal responses of two types of battery electrodes (e.g. films), namely cathodes and anodes. The specific composition of the cathode and anode and the assumed thermal properties of all constituents are shown in Tables 1 and 2 below. Following the simulations the results were qualitatively compared with experimentally measured temperature profiles (FIG. 10 and FIG. 11).

TABLE 1

| | type: | | |
|---|---|---|---|
| | Cathode | | Anode |
| | name | weight fraction | name | weight fraction |
| top layer: | NMC532 | 0.9 | Graphite | 0.92 |
| | Denka Black | 0.05 | SuperPLi Carbon Black | 0.02 |
| | PVDF5130 | 0.05 | PVDF9300 | 0.06 |
| bottom layer: | 15 μm thick aluminum | | 9 μm thick copper | |

TABLE 2

| name | K [W/(m K)] | $c_P$[J/(kg K)] | ρ [kg/m$^3$] |
|---|---|---|---|
| NMC532 | 40. | 48.33 | 4770. |
| Graphite | 140. | 710. | 2260. |
| Denka Black | 140. | 710. | 2250. |
| SuperPLi Carbon Black | 140. | 710. | 2250. |
| Air | 0.02587 | 1007. | 1.275 |
| PVDF5130 | 0.2 | 1530. | 1750. |
| PVDF9300 | 0.2 | 1530. | 1750. |
| Copper | 400. | 384.4 | 8960. |
| Aluminum | 235. | 904. | 2700. |

The simulations results clearly show that there is significant difference in the thermal responses for the two cathodes analyzed (NMC NMP2764 and NMC NMP98). More specifically, the cathode NMC NMP98 having a lower porosity and a higher thickness yielded markedly lower maximum temperature responses when subjected to substantially the same thermal excitation (e.g. energy input). It is noted that the experimental results for the two cathodes, shown in FIG. 10, exhibit substantially the same trend in the measured response. The difference between the maximum temperatures is about twice as large in the experiment relative to the model predictions. However, this difference can be corrected by properly fitting the Qsource and he parameters in the macro-model.

Contrary to the cathode case, the simulation results for the anodes analyzed, A12 SBR and A12 TDR102A, yielded practically identical temperature profiles, in spite of the fact that the electrodes were assumed to be of different thickness and porosity. It was interesting to note that exactly the same observation was made for the experimental results (see FIG. 11). Consequently, the model was found to agree very well with the experiment results obtained for both types of anode materials. In the next step, a more thorough investigation was performed to analyze the thickness and porosity effects. It was found in the case of the anodes both thickness and porosity changed in the same direction, whereas in cathodes the two parameters changed in the opposite directions. Thus, for the anodes, the thickness and porosity effects on thermal response were of the opposite sign and similar magnitude. Therefore, they canceled each other producing practically identical thermal responses.

The model developed in this study was also used to predict and separate the porosity and thickness effects. To achieve this goal, two sets of simulations were performed. In the first set, the electrode thickness (e.g. film thickness) was fixed at about 60 μm and the porosity was varied over a wide range. In the second set, the porosity was kept constant at about 60% and thickness changed from about 50 μm to about 200 μm. The results of these simulations (FIG. 12 and FIG. 13) showed that for both types of battery electrodes (e.g. films) the maximum temperature changes almost linearly over entire range of porosities. The model also predicted an almost linear decrease of maximum temperature as a function of electrode thickness. These modeling results proved to be very helpful in understanding the behavior of battery electrodes to thermal scanning. It was concluded that porosity monitoring through a calibrated thermal scanning may be accomplished, in situations where the film thickness is kept constant or is measured in-line by a separate sensor and fed as an input to a porosity calibration procedure (as just described). Then, for given film thickness, a linear calibration curve may be obtained either through detailed modeling (as described above) and/or simply by scanning at least two samples of different but known porosities.

As indicated above, knowledge of the thickness and areal weight of the film being evaluated for density, porosity, etc. may assist with reducing the number of unknowns needed to fully define a predictive porosity and density model. In some embodiments of the present disclosure, at least one thickness measurement may be obtained using at least one laser caliper and at least one areal weight measurement may be obtained using at least one x-ray fluorescence (XRF) instrument. These methods are described in more detail in the examples below. In general, in some embodiments of the present disclosure, a film may be irradiated by at least one of laser light and/or light in the x-ray region of electromagnetic spectrum, where the laser light and/or the x-rays are provided by at least one laser source and/or x-ray source. A first detector may then capture reflected laser light or emitted X-rays, such that the captured electromagnetic energy is used to calculate the thickness or areal weight of the film. This method for calculating the thickness and areal weight of a film may be accomplished at a single point in space, e.g. to continuously evaluate the thickness of a continuous film (e.g. web) at a single point somewhere along the film's width (e.g. fixed along the width dimension, the y-axis, similar to that shown in FIG. 5a). Alternatively, the laser source and/or x-ray source and/or the detector may be moved relative to the width dimension of the film (e.g. the y-axis) to provide thickness measurements at various points across the width of the film (e.g. similar to that shown in FIG. 5c).

The disclosure now being generally described will be more readily understood by reference to the following examples, which are included merely for the purposes of illustration of certain aspects of the embodiments of the present invention. The examples are not intended to limit the invention, as one of skill in the art would recognize from the above teachings and the following examples that other techniques and methods can satisfy the claims and can be employed without departing from the scope of the claimed invention. Although only a few exemplary embodiments of this invention have been described in detail above, those skilled in the art will readily appreciate that many modifications are possible in the exemplary embodiments without materially departing from the novel teachings and advantages of this invention.

Example 1

Referring to FIG. 14, a battery electrode 700 was positioned on glass rods 710 and 720 to minimize conductive heat losses to the environment. The electrode 700 was a bilayer electrode constructed from a top porous film 702 positioned in direct physical contact with a bottom metallic film 704. In this example, the top film 702 was a 75 micron thick Li ion battery cathode constructed of NMC532 particles, Denka Black particles and PVDF polymer binder. The bottom film 504 was a 15 micron thick Aluminum film. A tungsten halogen line radiation source 200 was used to provide the energy input to the battery electrode 700 by focusing the light through a lens 740. In this example, the halogen radiation source 200 provided a power input of about 200 mW/cm$^2$. The radiation source 200 applied radiation to the battery electrode 700 in a static set-up where neither the light, the thermal response detector 400, nor the electrode was moved during the illuminating. A starting temperature of the electrode 700, before illumination by the radiation source 200, and the thermal response (e.g. temperature changes) resulting from illuminating the surface of the electrode 700 using the tungsten halogen radiation source 200 were measured using the thermal response detector 400, in this case an infrared (IR) thermometer. The temperature rise resulting in the film was about 3° C.

FIG. 15 illustrates a temperature map 800 resulting from the procedure similar to the one described above where an IR camera and white LED radiation source were used. The temperature map 800 clearly shows temperature profiles and gradients resulting from radiating a portion of the surface of the battery electrode using the LED line radiation source. A highest temperature zone occurred on the surface where the electrode was radiated, and is evident as a high temperature region 820 (a vertical line) at a temperature of about 27.9° C. or higher. Heat transfer is also evident in the temperature map 800 as the temperature drops off on either side of the high temperature region 820 (to the left and right of the high temperature region 820). This drop in temperature is also demonstrated by the temperature curve 810 plotted below the temperature map 800, which corresponds to the temperatures measured at the electrode's centerline 830. Both the temperature map 800 and the temperature curve 810 show that, as the temperature detector 400 (as shown in FIG. 14) was moved to the extreme left-hand side of the battery electrode 700, a temperature relatively close to the electrode's starting temperature (e.g. before the electrode was radiated with light) was attained; e.g. about 23.7° C. or less.

In some embodiments of the present disclosure, the energy source that provides energy input into a film may be positioned on the same side as the detector used to measure the resultant thermal response; e.g. temperature changes, profiles, and/or gradients. For example, both the energy source and the detector may be positioned above the film, or alternatively, both may be positioned below the film. Alternatively (or in addition to), the energy source and the detector may be positioned on opposite sides of the film being evaluated.

FIG. 16 illustrates results obtained from another method for estimating one or more physical properties of a film by applying energy to a static film for a period of time, then stopping the application of energy to the film, followed by measuring a transient thermal response, e.g. a temperature decay, of at least one portion of the electrode. In this case, four different Li ion battery electrodes, each with a different construction (A12_SBR, A12_TDR102A, NMC_NMP-2764, and NMC_NMP98; see Table 3 below for details on each), were evaluated similarly to the procedure described above for FIG. 14. FIG. 16 clearly demonstrates that different temperature decay rates were obtained for cathodes (NMC_NMP2764, and NMC_NMP98), with the differences at least attributable to variations between the cathodes in solid loading, porosity and thickness. These temperature decay rates were measured at each electrode's centerline, similar to the centerline 830 illustrated in FIG. 15. The radiation source was an IntraLED 2020 by Volpi with a power rating of about 15 W. The radiation source and the detector were positioned on the same side of the film. The camera's field of view was about 6 inches by 6 inches (in the X and Y directions) and the field of view included the portion that was directly radiated by the radiation source. The time period of exposure for this batch test was about 3 minutes.

TABLE 3

| | type | thickness [μm] | solid loading [mg/cm$^2$] | porosity [—] |
|---|---|---|---|---|
| NMCNMP98 | Cathod | 75. | 9.8 | 0.61 |
| NMCNMP2764 | Cathod | 146. | 27.64 | 0.49 |

TABLE 3-continued

| | type | thickness [μm] | solid loading [mg/cm²] | porosity [—] |
|---|---|---|---|---|
| A12TRD | Anode | 68. | 5.667 | 0.57 |
| A12SBR | Anode | 82. | 5.114 | 0.68 |

Example 2

This example summarizes the results obtained from one embodiment of the present disclosure, where the films were not held statically, but instead were moved in a linear direction relative to a fixed radiation source and a fixed detector. This experiment investigated another embodiment of the present disclosure, one that simulated continuous evaluation of a moving film (relative to the energy source and the thermal response detector), as might occur in a large-scale, continuous manufacturing plant. Specifically, the same basic experimental setup as described above for FIG. 14 was utilized, except that the film was moved from right to left at a speed of about 0.1 inches/second underneath a fixed LED line radiation source (the radiation source) and a fixed IR camera (the detector). The radiation source and the detector were positioned on the same side of the film. The camera's field of view was about 6 inches by 6 inches (in the X and Y directions) and the field of view included the portion that was directly radiated by the radiation source. FIG. 17 illustrates a representative temperature map that resulted from this dynamic evaluation procedure.

As in the temperature map of FIG. 15, the temperature map 1000 of FIG. 17 clearly illustrates a thermal response, e.g. temperature changes, temperature profiles or gradients, within the battery electrode resulting from radiating a portion of the surface of the battery electrode using a LED line radiation source. A highest temperature zone occurred in the vicinity of the portion of the electrode that was radiated, and is evident as a high temperature region 1020 (evident as a high temperature vertical line) at a temperature of about 26.5°. Evidence of heat transfer is clearly visible in the temperature map 1000, as the temperature drops off measurably on either side of the high temperature region 1020 (to the left and right of the high temperature region 1020). This drop in temperature was also demonstrated by the temperature curve 1010 plotted below the temperature map 1000, which corresponds to the temperatures measured at the electrode's centerline 1030. Both the temperature map 1000 and the temperature curve 1010 show that as the electrode is moved from right to left, significant cooling occurred as the electrode moved away from the high temperature region in the immediate vicinity of the radiation source. To the extreme left, a temperature relatively close to the electrode's starting temperature (e.g. before the electrode was radiated with light) was eventually attained; e.g. about 25.5° C. or less.

For these conditions, the battery electrodes tested eventually reached steady-state, equilibrium temperature profiles or gradients, meaning that the energy added to the electrode by the radiation source was equally balanced by heat losses from the electrode (e.g. by convective and radiant energy losses to the environment). FIG. 18 summarizes four such equilibrium temperature profiles (corresponding to the electrodes' centerline temperatures) obtained from the same cathode materials tested by the static method described and illustrated in FIGS. 14 and 15 above. These temperature profiles clearly illustrate that the shapes of these profiles can be used to distinguish differences between the cathode materials.

Example 3

This example illustrates a process for measuring the porosity of Li ion battery electrodes, utilizing one or more heated rollers for providing heat transfer to the electrodes to cause a measurable temperature change within the electrodes. In this example, the micro-structure of the electrodes includes two main layers as shown in FIG. 19: a metal (aluminum or copper) foil base layer on which is positioned a layer of functional particles joined together by a polymer binder. The porosity of the functional particle layer may be substantial, typically in the 40-60% range. Monitoring and precise control of this porosity is crucial for proper operation of the final battery that utilizes the electrodes. The functional particle layer is formed in a die coater process, with the resultant coating dried in an oven. After drying the electrode bilayer film may be passed through an evaluation system that includes a heated roller and a detector to perform an in-line evaluation of the functional particle layer's porosity.

FIG. 20 provides a hypothetical thermal response of a film similar to that illustrated in FIG. 19, using such an evaluation system. FIG. 20 plots the temperature of the functional particle layer along the length of the film, T(x), for materials of two different porosities. In this example, after coating and drying the temperature of the battery electrode, T0, remained higher than room temperature and was not well-defined. Therefore, a stabilizing roller with large thermal mass and temperature T1 was used to bring the temperature of the continuous film to a lower temperature (T1). Following this cooling step, the film was run over the heated roller that was maintained at elevated temperature T2, where T2 was larger than T1. The temperature difference, T2-T1, was maintained at least 30° C. in order to accurately monitor changes in the film's (e.g. electrode's) porosity. The temperature of the top layer T(x), was acquired by an infrared camera (e.g. detector), and reached a maximum temperature value of T3. The system was setup so that T3 was lower than T2. The actual difference between T3 and T2 may depend on, among other things, the thermal properties of the heated roller, the contact area, the web-line speed, and the physical properties of the electrode. During the film heating process, heat was transferred from the heated roller to the metal foil, and then from the metal foil to the functional particle layer. Consequently, T3 and the entire T(x) profile may be strongly dependent on the thickness, porosity and composition of the functional particle layer. Thus, in situations where the thickness of the electrode is known and/or measured simultaneously, and the other parameters of the system (such as the functional particle layer's composition, the process line speed, etc.) do not change, the porosity may be the only unknown. Thus, the porosity may be determined from the temperature(s) attained by contacting the film with the heated roller (e.g. T3 or the entire T(x) profile) based on previously established calibration data, curves, and/or models as described above.

Example 4

FIGS. 21-23 illustrate thickness data collected using a laser method. FIG. 21a describes a dual laser caliper system for in-line thickness measurement of an (electrode) coating on a substrate of known thickness. The parameters "$\gamma_1$" and "$\gamma_2$" represent the voltage output from the displacement sensors on either side (i.e. "1" for top and "2" for bottom) of the web. The parameter "t" represents the coating thickness, and the parameter "l" represents a calibration constant. The parameter "m" represents the slope of γ/t or γ/l in V/mm. The parameter "l" can be used to handle the situation where the top and bottom laser focal points do not exactly coincide (i.e. using a calibration constant) or for implementing a known thickness value (such as the substrate thickness). FIG. 21b shows measured thickness values for a bare Al foil substrate with a nominal thickness of 0.015 mm. In this sensor calibration case, "t" was the bare Al foil thickness, and "l" was used to determine the measurement error with "1" (calibration constant for determining the deviation from perfect alignment of the laser sensor focal points). The measured bare Al foil thickness (0.0151±0.0006 mm) was then used as the "l" value for subsequent (electrode) coating thickness measurements. FIG. 22 shows data from example electrode coating trials "1", "2", and "3" for a wet lithium-ion battery cathode dispersion (90 wt % $LiNi_{0.5}Mn_{0.3}Co_{0.2}O_2$, 5 wt % carbon black, and 5 wt % polyvinylidene fluoride (PVDF)) deposited onto Al foil. The plots are representative of initial measured variation in the coating thickness. FIGS. 23a and 23b show measured coating variation after coating deposition optimization for a lithium-ion battery cathode (FIG. 23a) on Al foil and anode (FIG. 23b) on Cu foil.

What is claimed is:

1. A method comprising:
   transferring heat to a portion of a film, wherein the transferring causes a thermal response in the portion of the film;
   measuring at least a part of the thermal response;
   generating at least one thermal response metric that represents the thermal response; and
   determining a physical property of the film by inputting at least one thermal response metric into a predictive model, wherein:
   the transferring of heat is supplied continuously at a steady-state heating rate, and
   the thermal response comprises a maximum temperature reached on a surface of the first portion of the film.

2. The method of claim 1, wherein the predictive model comprises a calibration curve that correlates the at least one thermal response metric with at least one of a film density, a film porosity, or a film thickness.

3. The method of claim 1, wherein the predictive model comprises:
   a microscale model that estimates an effective heat conductivity as a first function of at least the actual heat conductivities of at least two components of the film;
   the microscale model estimates an effective heat capacity of the film as a second function of the actual heat capacities of the at least two components of the film; and
   a macroscale model that estimates at least one of a film density, a film porosity, or a film thickness as a function of at least the effective heat conductivity, the effective heat capacity, and the at least one thermal response metric.

4. The method of claim 1, wherein the thermal response further comprises a rate of change of a temperature for the surface of the portion of the film.

5. The method of claim 1, wherein the transferring of heat to the portion of the film is essentially in the shape of a one-dimensional line.

6. A roll-to-roll system comprising:
   a heat source configured to transfer heat continuously at a steady-state heating rate to at least a portion of a continuous film;
   a first detector, and;
   a predictive model, wherein:
   the detector is configured to detect a thermal response in the portion of the continuous film,
   the thermal response comprises a maximum temperature reached on a surface of the portion of the continuous film, and
   the predictive model receives the at least one thermal response to predict at least one of a density, a porosity, or a thickness of the continuous film.

7. The roll-to-roll system of claim 6, wherein the heat source comprises at least one radiation source.

8. The roll-to-roll system of claim 6, wherein the radiation source comprises at least one of a light-emitting diode, an infrared heater, an infrared lamp, or a resistive heating element.

9. The roll-to-roll system of claim 8, wherein the radiation source radiates electromagnetic radiation having a plurality of wavelengths between about 1 μm and about 1 mm.

10. The roll-to-roll system of claim 9, wherein the radiation source comprises at least one resistive heating element and a reflector.

11. The roll-to-roll system of claim 10, wherein the at least one resistive heating element comprises at least one of a rod, a cylinder, or a filament.

12. The roll-to-roll system of claim 10, wherein the at least one resistive heating element has a first emissivity between greater than zero and about 0.80.

13. The roll-to-roll system of claim 12, wherein:
    the resistive heating element comprises a modified section, wherein the modified section is modified by at least one of polishing, painting, or coating a portion of the resistive heating element, and
    the modified section has a second emissivity that is less than the first emissivity.

14. The roll-to-roll system of claim 10, wherein the reflector has a shape substantially in the form of a part of an elliptical cylinder.

15. The roll-to-roll system of claim 6, wherein:
    the heat source comprises at least one heating element, and
    the at least one heating element contacts the continuous film such that the heat transferred to the continuous film is at least partially by conductive heat transfer.

16. The roll-to-roll system of claim 15, wherein the at least one heating element is a heated roller.

17. The roll-to-roll system of claim 16, further comprising at least one stabilizing roller.

18. The roll-to-roll system of claim 6, wherein the predictive model comprises a calibration curve.

19. The roll-to-roll system of claim 6, wherein the predictive model comprises:
    a microscale model that estimates an effective heat conductivity as a first function of at least the actual heat conductivities of at least two components of the continuous film;
    the microscale model estimates an effective heat capacity of the continuous film as a second function of the actual heat capacities of the at least two components of the continuous film; and
    a macroscale model that estimates at least one of a continuous film density, a continuous film porosity, or a continuous film thickness as a function of at least the effective heat conductivity, the effective heat capacity, and the at least one thermal response metric.

20. The roll-to-roll system of claim 6, further comprising:
at least one laser that transfers laser light to the continuous film; and
a second detector, wherein:
the second detector is configured to capture at least one of reflected laser light,
the reflected laser light is used to calculate a thickness of the continuous film, and
the thickness is an input to the predictive model and used to predict the at least one of the density and/or the porosity of the continuous film.

21. The roll-to-roll system of claim 6, further comprising:
at least one x-ray source; and
a second detector, wherein:
the second detector is configured to capture at least one of emitted x-rays,
the emitted x-rays are used to calculate a thickness of the continuous film, and
the thickness is an input to the predictive model and used to predict the at least one of the density and/or the porosity of the continuous film.

\* \* \* \* \*